US009449474B2

(12) United States Patent
Kurosawa

(10) Patent No.: US 9,449,474 B2
(45) Date of Patent: Sep. 20, 2016

(54) SALES DATA PROCESSING DEVICE, SALES DATA PROCESSING METHOD AND COMPUTER READABLE STORAGE MEDIUM

(75) Inventor: Kazuo Kurosawa, Kanagawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 13/569,434

(22) Filed: Aug. 8, 2012

(65) Prior Publication Data
US 2013/0054392 A1  Feb. 28, 2013

(30) Foreign Application Priority Data

Aug. 23, 2011 (JP) ................................. 2011-181800

(51) Int. Cl.
G06Q 20/00 (2012.01)
G07G 1/00 (2006.01)
G07G 3/00 (2006.01)

(52) U.S. Cl.
CPC ............ *G07G 1/0009* (2013.01); *G07G 3/006* (2013.01)

(58) Field of Classification Search
None
See application file for complete search history.

(56) References Cited

U.S. PATENT DOCUMENTS

| | | | | |
|---|---|---|---|---|
| 4,317,172 A * | 2/1982 | Nakano | ............................ | 705/24 |
| 4,595,985 A * | 6/1986 | Sakakiya | ......................... | 705/18 |
| 4,630,200 A * | 12/1986 | Ohmae et al. | .................. | 705/17 |
| 4,939,706 A * | 7/1990 | Nose | ................................ | 368/10 |
| 5,756,977 A * | 5/1998 | Biss | ................................ | 235/7 R |
| 5,943,208 A * | 8/1999 | Kato et al. | ................ | 361/679.31 |
| 8,224,701 B2 * | 7/2012 | Chien et al. | ...................... | 705/21 |
| 2007/0135965 A1* | 6/2007 | Nguyen et al. | ................ | 700/231 |
| 2008/0303902 A1* | 12/2008 | Romer et al. | .................. | 348/143 |
| 2009/0254444 A1* | 10/2009 | Harada | .......................... | 705/18 |
| 2011/0102634 A1* | 5/2011 | Pardue | ........................ | 348/231.9 |
| 2011/0131105 A1* | 6/2011 | Aonuma et al. | ................. | 705/24 |
| 2011/0172960 A1* | 7/2011 | St.George et al. | ............ | 702/179 |

FOREIGN PATENT DOCUMENTS

| | | |
|---|---|---|
| JP | 02-054397 | 2/1990 |
| JP | 04-195497 | 4/1992 |

(Continued)

OTHER PUBLICATIONS

Japanese Office Action for Japanese Application No. 2011-181800 mailed on Jun. 11, 2013.

(Continued)

*Primary Examiner* — Fateh M Obaid
(74) *Attorney, Agent, or Firm* — Amin, Turocy & Watson LLP

(57) ABSTRACT

A sales data processing device of the present invention accepts operations by an operator, opens a drawer, and is provided with a history acquisition unit, a reference information acquisition unit and an irregularity detection unit. The history acquisition unit acquires a history of operations by the operator. The reference information acquisition unit acquires, from references of standard operations set in advance for each of operations that cause the drawer to open, the standard operation references for operations specified in the history. For each of the operations specified in the history, the irregularity detection unit finds a difference from the standard operation reference acquired by the reference information acquisition unit, and if the difference is of at least a predetermined level, detects that the operation is an irregular drawer operation.

4 Claims, 16 Drawing Sheets

(56) References Cited

FOREIGN PATENT DOCUMENTS

| | | | |
|---|---|---|---|
| JP | 06-004768 | 1/1994 | |
| JP | 09-161154 | 6/1997 | |
| JP | 2001-126143 | 5/2001 | |
| JP | 2011-118653 | 6/2011 | |
| WO | WO 2011118245 A1 * | 9/2011 | ............... G07G 1/00 |

OTHER PUBLICATIONS

Japanese Office Action for Japanese Application No. 2013-216370 mailed Jan. 27, 2015.

Japanese Office Action for Japanese Patent Application No. 2015-140355 mailed Jun. 7, 2016.

* cited by examiner

FIG.2

FUNCTION DETAILS

| FUNCTION CODE | FUNCTION NAME | FUNCTION DETAILS |
|---|---|---|
| 0001 | PREPARE CHANGE | USED WHEN PUTTING CHANGE INTO THE SALES DATA PROCESSING DEVICE 10 BEFORE THE STORE OPENS. THE TOTAL VALUE OF THE PREPARED CHANGE IS INPUTTED WITH THE NUMBER KEYS 21, THE "PREPARE CHANGE" KEY OF THE FUNCTION KEYS 22 IS PRESSED, AND THE DRAWER 25 OPENS AUTOMATICALLY. THE CHANGE IS PUT INTO THE DRAWER 25, AND THE DRAWER 25 IS CLOSED BY HAND |
| 0002 | DISCOUNT | USED WHEN DEDUCTING A DISCOUNT. DURING INPUT OF A PRODUCT SALE, THE DISCOUNT AMOUNT IS INPUTTED WITH THE NUMBER KEYS 21, THE "DISCOUNT" KEY OF THE FUNCTION KEYS 22 IS PRESSED, AND THE DISCOUNT IS DEDUCTED<br>FIRST PRODUCT: ¥500<br>SECOND PRODUCT: ¥250<br>DISCOUNT: -¥50 |
| 0003 | CASH | USED WHEN CASH IS PAID BY A CUSTOMER.<br>THE AMOUNT SUBMITTED BY THE CUSTOMER IS INPUTTED WITH THE NUMBER KEYS 21, THE "CASH" KEY OF THE FUNCTION KEYS 22 IS PRESSED, CHANGE IS DISPLAYED AT THE DISPLAY UNIT 23, AND THE DRAWER 25 OPENS AUTOMATICALLY. THE SUBMITTED MONEY IS DEPOSITED IN THE DRAWER 25, AND THE CHANGE IS TAKEN FROM THE DRAWER 25 AND GIVEN TO THE CUSTOMER. WHEN THIS IS COMPLETED, THE DRAWER 25 IS CLOSED BY HAND |
| 0004 | EXCHANGE | USED WHEN AN EXCHANGE IS REQUESTED.<br>THE "EXCHANGE" KEY OF THE FUNCTION KEYS 22 IS PRESSED AND THE DRAWER 25 OPENS AUTOMATICALLY. WHEN THE EXCHANGE IS COMPLETED, THE DRAWER 25 IS CLOSED BY HAND |
| 0005 | CANCEL TRANSACTION | IF ALL INPUTTED PRODUCTS SHOULD BE CANCELLED, THE "CANCEL TRANSACTION" KEY OF THE FUNCTION KEYS 22 IS PRESSED |
| 0006 | SUBTOTAL | USED TO FIND A TOTAL VALUE PARTWAY THROUGH A SINGLE RECEIPT OR FOR THE WHOLE RECEIPT.<br>THE "SUBTOTAL" KEY OF THE FUNCTION KEYS 22 IS PRESSED, AND THE TOTAL VALUE OF INPUTTED PRODUCTS IS DISPLAYED AT THE DISPLAY UNIT 23 |
| 0007 | DEPOSIT | USED WHEN CASH UNRELATED TO A SALE IS DEPOSITED IN THE DRAWER 25. THE DEPOSIT AMOUNT IS INPUTTED WITH THE NUMBER KEYS 21, THE "DEPOSIT" KEY OF THE FUNCTION KEYS 22 IS PRESSED, AND THE DRAWER 25 OPENS AUTOMATICALLY. THE MONEY IS DEPOSITED IN THE DRAWER 25 AND THE DRAWER 25 IS CLOSED BY HAND |
| 0008 | WITHDRAWAL | THE REVERSE OF 0007 DEPOSIT |
| ... | MERCHANDISE COUPON | USED WHEN A CUSTOMER PAYS WITH A MERCHANDISE COUPON.<br>THE VALUE OF THE COUPON IS INPUTTED WITH THE NUMBER KEYS 21, THE "MERCHANDISE COUPON" KEY OF THE FUNCTION KEYS 22 IS PRESSED, AND THE DRAWER 25 OPENS AUTOMATICALLY. THE COUPON IS DEPOSITED IN THE DRAWER 25 AND THE DRAWER 25 IS CLOSED BY HAND |
| ... | CASH-IN-DRAWER DECLARATION | WHEN THE STORE CLOSES, COUNTS AMOUNTS IN THE DRAWER 25 AND REGISTERS THE AMOUNTS IN THE SALES DATA PROCESSING DEVICE 10. WHETHER THE AMOUNTS IN THE SALES DATA PROCESSING DEVICE 10 AND THE DRAWER 25 MATCH CAN BE FOUND BY SETTLEMENT PROCESSING. THE "CASH-IN-DRAWER DECLARATION KEY" OF THE FUNCTION KEYS 22 IS PRESSED AND THE DRAWER 25 AUTOMATICALLY OPENS. IN ACCORDANCE WITH INSTRUCTIONS FROM THE SALES DATA PROCESSING DEVICE 10, NUMBERS OF NOTES/COINS IN EACH DENOMINATION ARE INPUTTED. WHEN THIS IS COMPLETED, THE DRAWER 25 IS CLOSED BY HAND |
| ... | INSPECTION | USED WHEN SALES AMOUNTS FOR THE CURRENT DAY SO FAR ARE TO BE FOUND.<br>THE "INSPECTION" KEY OF THE FUNCTION KEYS 22 IS PRESSED AND VARIOUS REPORTS ARE PRINTED BY THE PRINTING UNIT 24 |
| ... | SETTLEMENT | USED WHEN ESTABLISHING SALES AMOUNTS FOR THE DAY.<br>THE "SETTLEMENT" KEY OF THE FUNCTION KEYS 22 IS PRESSED AND VARIOUS REPORTS ARE PRINTED BY THE PRINTING UNIT 24 |
| ... | | |

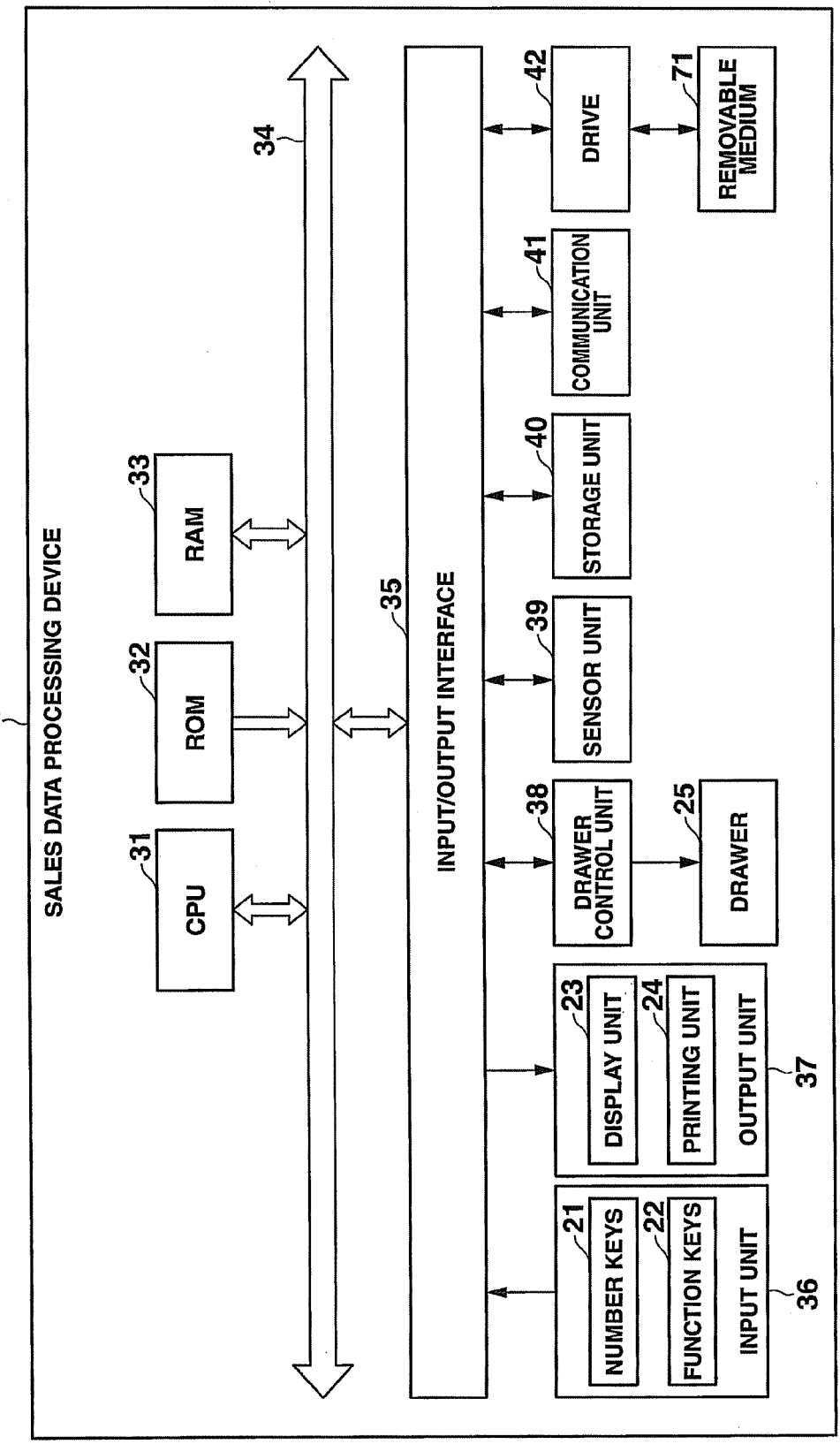

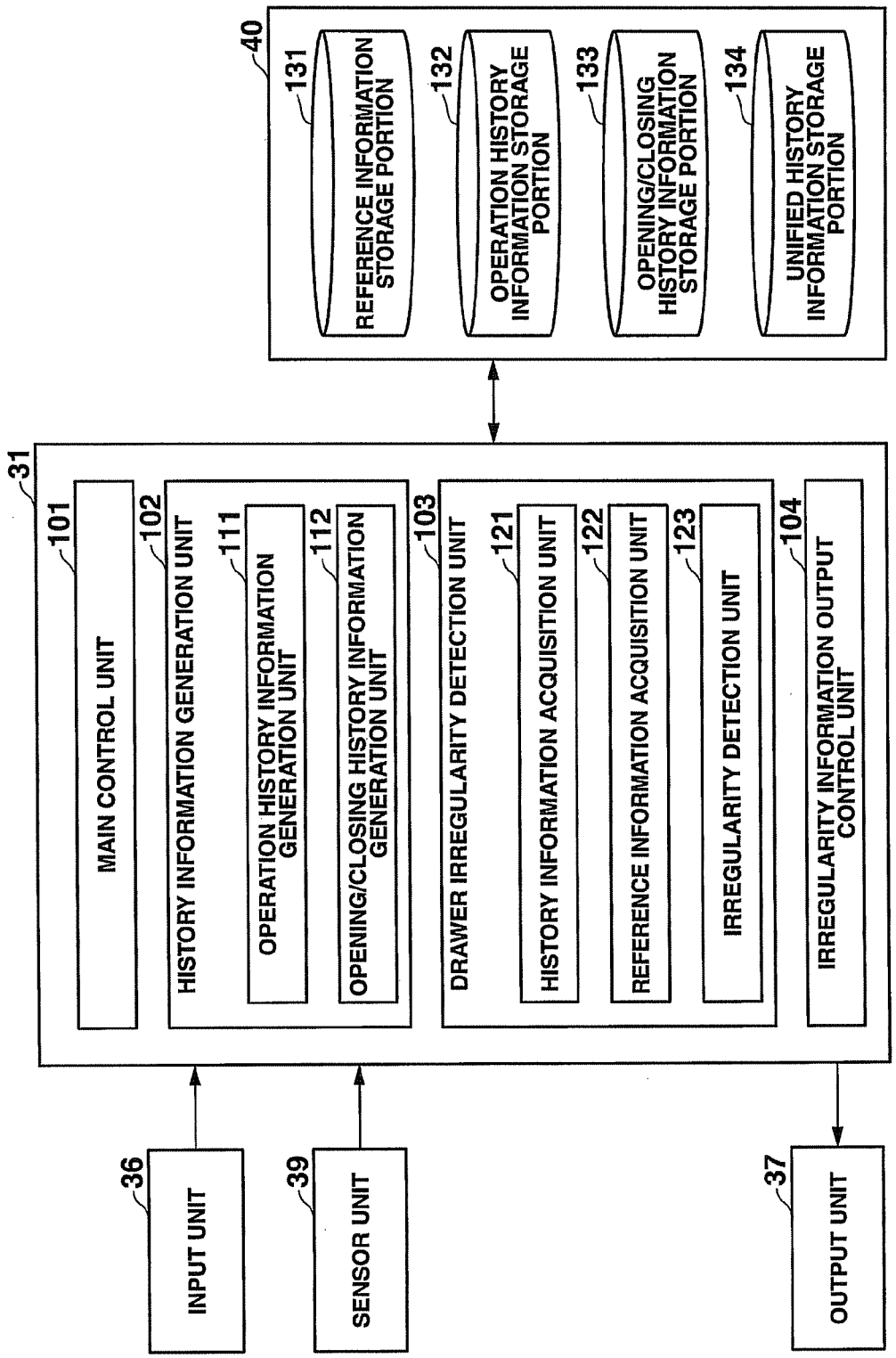

FIG.5

| HISTORY INFORMATION FILE | | | | | | |
|---|---|---|---|---|---|---|
| DATE | TIME | FUNCTION CODE | FUNCTION NAME | DRAWER AUTOMATIC OPENING FLAG | OPERATOR | AMOUNT |
| 2011/3/12 | 09:11:21.022 | 0001 | PREPARE CHANGE | 1 | ITO | |
| 2011/3/12 | 09:21:01.012 | 0002 | DISCOUNT | 0 | ITO | ¥100 |
| 2011/3/12 | 09:21:02.012 | 0003 | CASH | 1 | ITO | ¥2,325 |
| 2011/3/12 | 09:23:02.211 | 0003 | CASH | 1 | ITO | ¥5,230 |
| 2011/3/12 | 09:24:02.112 | 0005 | CANCEL TRANSACTION | 0 | ITO | |
| 2011/3/12 | 09:25:02.112 | 0003 | CASH | 1 | ITO | ¥210 |
| 2011/3/12 | 09:26:02.012 | 0004 | EXCHANGE | 1 | ITO | |
| 2011/3/12 | 09:31:02.432 | 0003 | CASH | 1 | YOSHIDA | ¥3,500 |

FIG.6

| DRAWER OPENING/CLOSING HISTORY FILE | | |
|---|---|---|
| DATE | TIME | OPENING/ CLOSING |
| 2011/3/12 | 09:11:21.982 | OPENED |
| 2011/3/12 | 09:14:04.001 | CLOSED |
| 2011/3/12 | 09:21:02.055 | OPENED |
| 2011/3/12 | 09:22:02.211 | CLOSED |
| 2011/3/12 | 09:25:02.832 | OPENED |
| 2011/3/12 | 09:26:02.111 | CLOSED |
| 2011/3/12 | 09:31:03.034 | OPENED |
| 2011/3/12 | 09:31:12.342 | CLOSED |

FIG.7A

| INTERMEDIATE MERGE FILE | | | | |
|---|---|---|---|---|
| DATE | TIME | FUNCTION NAME OR OPENING/CLOSING | OPERATOR | AMOUNT |
| 2011/3/12 | 09:11:21.022 | PREPARE CHANGE | ITO | |
| 2011/3/12 | 09:11:21.982 | OPENED | | |
| 2011/3/12 | 09:14:04.001 | CLOSED | | |
| 2011/3/12 | 09:21:02.012 | CASH | ITO | ¥2,325 |
| 2011/3/12 | 09:21:02.055 | OPENED | | |
| 2011/3/12 | 09:22:02.112 | CASH | ITO | ¥210 |
| 2011/3/12 | 09:22:02.211 | CLOSED | | |
| 2011/3/12 | 09:25:02.211 | CASH | ITO | ¥5,230 |
| 2011/3/12 | 09:25:02.832 | OPENED | | |
| 2011/3/12 | 09:26:02.012 | EXCHANGE | ITO | |
| 2011/3/12 | 09:26:02.111 | CLOSED | | |
| 2011/3/12 | 09:31:02.432 | CASH | YOSHIDA | ¥3,500 |
| 2011/3/12 | 09:31:03.034 | OPENED | | |
| 2011/3/12 | 09:31:12.342 | CLOSED | | |

FIG.7B

| COUNT TOTALS FILE | | | |
|---|---|---|---|
| DATE | OPERATOR | FUNCTION NAME | OCCURRENCE COUNT |
| 2011/3/12 | ITO | EXCHANGE | 15 |
| 2011/3/12 | ITO | WITHDRAWAL | 7 |
| 2011/3/12 | YOSHIDA | DEPOSIT | 1 |
| 2011/3/12 | YOSHIDA | WITHDRAWAL | 3 |

FIG.8

| DRAWER OPENING/CLOSING MANAGEMENT TABLE | | | |
|---|---|---|---|
| OPERATOR | FUNCTION NAME | DRAWER OPENING PERMITTED DURATION (sec.) | DRAWER OPENING PERMITTED COUNT |
| ITO | CASH | 30 | 9999 |
| ITO | MERCHANDISE COUPON | 30 | 99 |
| ITO | EXCHANGE | 60 | 10 |
| ITO | DEPOSIT | 15 | 2 |
| ITO | WITHDRAWAL | 15 | 2 |
| ITO | PREPARE CHANGE | 120 | 120 |
| ITO | INSPECTION | 120 | 5 |
| ITO | SETTLEMENT | 120 | 1 |
| ITO | CASH-IN-DRAWER DECLARATION | 300 | 2 |
| YOSHIDA | CASH | 30 | 9999 |
| YOSHIDA | MERCHANDISE COUPON | 30 | 99 |
| YOSHIDA | EXCHANGE | 60 | 10 |
| YOSHIDA | DEPOSIT | 0 | 0 |
| YOSHIDA | WITHDRAWAL | 0 | 0 |
| YOSHIDA | PREPARE CHANGE | 0 | 0 |
| YOSHIDA | INSPECTION | 0 | 0 |
| YOSHIDA | SETTLEMENT | 0 | 0 |
| YOSHIDA | CASH-IN-DRAWER DECLARATION | 0 | 0 |

FIG.9

| OPERATOR MASTER FILE | | |
|---|---|---|
| OPERATOR CODE | OPERATOR | ..... |
| 0001 | ARIMORI | ..... |
| 0002 | ITO | ..... |
| ..... | ..... | ..... |
| ⋮ | ⋮ | ⋮ |

FIG.10

| FUNCTION MASTER FILE | | | |
|---|---|---|---|
| FUNCTION CODE | FUNCTION NAME | DRAWER AUTOMATIC OPENING FLAG | ..... |
| 0001 | PREPARE CHANGE | 1 | ..... |
| 0002 | DISCOUNT | 0 | ..... |
| 0003 | CASH | 1 | ..... |
| 0004 | EXCHANGE | 1 | ..... |
| 0005 | CANCEL TRANSACTION | 0 | ..... |
| 0006 | SUBTOTAL | 0 | ..... |
| 0007 | DEPOSIT | 1 | ..... |
| 0008 | WITHDRAWAL | 1 | ..... |
| ⋮ | ⋮ | ⋮ | ⋮ |

FIG.11A

DRAWER OPENING DURATION IRREGULARITY REPORT

|  |  |  |  |  | IRREGULAR DURATION |
|---|---|---|---|---|---|
| 2011/3/12 | 09:21 | ITO | CASH | ¥2,325 | 60 sec. |
| 2011/3/12 | 10:51 | YOSHIDA | EXCHANGE | – | 125 sec. |
| 2011/3/12 | 14:11 | ITO | EXCHANGE | – | 62 sec. |
| ⋮ | ⋮ | ⋮ | ⋮ | ⋮ | ⋮ |

FIG.11B

DRAWER OPENING COUNT IRREGULARITY REPORT

|  |  |  | COUNT |
|---|---|---|---|
| 2011/3/12 | ITO | EXCHANGE | 15 |
| 2011/3/12 | ITO | WITHDRAWAL | 7 |
| 2011/3/12 | YOSHIDA | DEPOSIT | 1 |
| 2011/3/12 | YOSHIDA | WITHDRAWAL | 3 |
| ⋮ | ⋮ | ⋮ | ⋮ |

SALES DATA PROCESSING DEVICE, SALES DATA PROCESSING METHOD AND COMPUTER READABLE STORAGE MEDIUM

This application is based on and claims the benefit of priority from Japanese Patent Application No. 2011-181800, filed on 23 Aug. 2011, the content of which is incorporated herein by reference.

BACKGROUND OF THE INVENTION

1. Field of the Invention

The present invention relates to a sales data processing device, a sales data processing method and a computer readable storage medium.

2. Related Art

In retail stores such as department stores, supermarkets, etc., retail staff perform task sequences, while in the presence of customers, of calculating charges for goods and recording the calculation results as sales for the store. For the computerization of this work, sales data processing devices such as electronic cash registers (ECR), point of sales (POS) terminals and the like have become widespread in recent years. Thus, sales staff now work as operators and operate sales data processing devices while serving customers.

A sales data processing device is provided with an openable compartment, referred to as a drawer, for the management of money from sales. The drawer is usually closed, and is opened under the control of the sales data processing device only when a predetermined operation is carried out by an operator. The opened drawer is then closed by manual operation by the operator.

The drawer is generally opened and closed in accordance with predetermined operations by an operator. Specifically, the drawer is opened and closed for the task of storing cash received from a customer in the drawer, the task of taking change from the drawer to give to a customer, and so forth. Opening and closing of the drawer for this kind of task has short durations. Therefore, if the drawer is left open for a long duration, there is a suspicion that cash is being improperly taken from the drawer.

Accordingly, Japanese Unexamined Patent Publication No. H02-54397, Japanese Unexamined Patent Publication No. H06-4768 and the like have disclosed technologies that give a warning when a duration for which a drawer is left open exceeds a reference value.

However, the technologies of Japanese Unexamined Patent Publication Nos. H02-54397 and H06-4768 only concentrate on a duration for which a drawer is left open, and it is difficult to appropriately detect the various operations of a sales data processing device with which there is a suspicion of cash being improperly removed from the drawer as being irregular drawer operations.

SUMMARY OF THE INVENTION

The present invention has an object of detecting operations with which there is a suspicion of cash being improperly removed from a drawer as being irregular drawer operations.

A sales data processing device of the present invention accepts operations by an operator and opens a drawer, and is provided with: a history acquisition unit that acquires a history of operations by the operator; a reference information acquisition unit that acquires, from references of standard operations set in advance for each of operations that cause the drawer to open, the standard operation reference for an operation specified in the history; and an irregularity detection unit that, for each of operations specified in the history, finds a difference from the standard operation reference acquired by the reference information acquisition unit, and if the difference is of at least a predetermined level, detects that the operation is an irregular drawer operation.

A non-transitory computer readable medium of the present invention has stored therein a program executable by a computer, causing the computer to realize functions of: acquiring a history of operations by an operator of a sales data processing device that accepts operations by the operator and opens a drawer; acquiring, from references of standard operations set in advance for each of operations that cause the drawer to open, the standard operation reference for an operation specified in the history; and, for each of operations specified in the history, finding a difference from the acquired standard operation reference, and if the difference is of at least a predetermined level, detecting that the operation is an irregular drawer operation.

Effects of the Invention

According to the present invention, operations with which there is a suspicion of cash being improperly removed from a drawer may be appropriately detected as being irregular drawer operations.

BRIEF DESCRIPTION OF THE DRAWINGS

FIG. 2 is a diagram showing examples of functions in a table format.

FIG. 3 is a block diagram illustrating hardware structure of the sales data processing device.

FIG. 4 is a block diagram illustrating, of functional structure of the sales data processing device in FIG. 3, functional structures for implementing history generation processing and drawer irregularity detection processing.

FIG. 5 is a diagram showing an example of structure of an operation history file.

FIG. 6 is a diagram showing an example of structure of a drawer opening/closing history file.

FIG. 7A and FIG. 7B are diagrams showing examples of structure of unified history files.

FIG. 8 is a diagram showing an example of structure of a drawer opening/closing management file.

FIG. 9 is a diagram showing an example of structure of an operator master file.

FIG. 10 is a diagram showing an example of structure of a function master file.

FIG. 11A and FIG. 11B are diagrams showing examples of drawer opening irregularity reports.

DETAILED DESCRIPTION OF THE PREFERRED EMBODIMENT

In the following, an embodiment of the present invention is explained with reference to the drawings.

Figure 1:
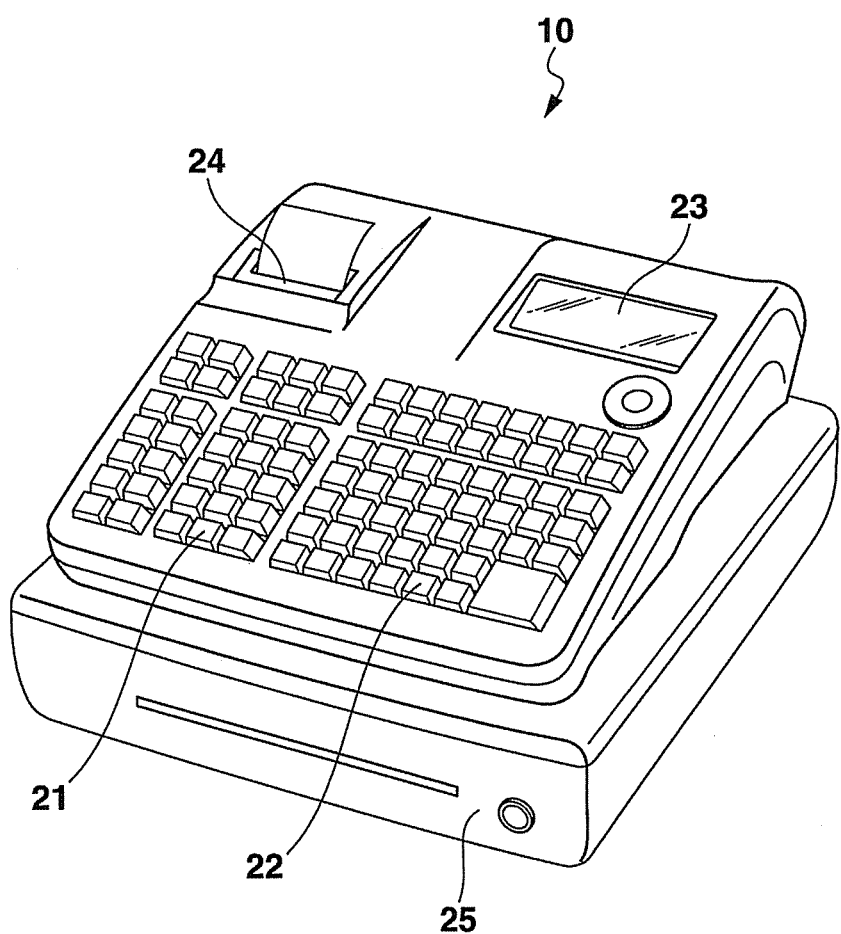
FIG. 1 is a perspective view showing the external structure of a sales data processing device in accordance with an embodiment of the present invention.

FIG. 1 is a perspective view showing the external structure of a sales data processing device in accordance with the embodiment of the present invention.

As shown in FIG. 1, a sales data processing device 10 is provided with number keys 21, function keys 22, a display unit 23, a printing unit 24 and a drawer 25.

The number keys 21 are constituted by a plural number of keys on which, although not shown in the drawing, various numbers are printed. Each of the plural keys is assigned the function of inputting the number printed thereon into the main body of the sales data processing device 10. That is, an operator may input a desired number into the sales data processing device 10 by pressing a key among the number keys 21 on which the desired number is printed.

The function keys 22 are constituted by a plural number of keys on which, although not shown in the drawing, the names of various functions are printed. Each of the plural keys is assigned the function of notifying the main body of the sales data processing device 10 of the function whose name is printed thereon.

The meaning of the term "function" as used herein includes a task that an operator performs by operating the sales data processing device 10. Functions that can be executed are determined for individual operators. An operator presses a key among the function keys 22 on which the name of a function that is currently being carried out or has just been carried out is printed. The sales data processing device 10 recognizes the function printed on the key that has been pressed as being a function that the operator is currently carrying out or has just carried out. Details of the functions are described below with reference to FIG. 2.

The display unit 23 is constituted by a liquid crystal display or the like, and displays various kinds of information required for the operator's tasks as images.

The printing unit 24 prints out various kinds of information required for the operator's tasks, receipts for customers and the like on a paper medium.

The drawer 25 is an openable compartment for managing money from sales.

The drawer 25 is usually closed but is opened under the control of the sales data processing device 10 when predetermined operations are carried out by the operator. The opened drawer 25 is closed by a manual operation by the operator.

Now, operations of the sales data processing device 10 by an operator (hereinafter referred to as "operations for sales data processing") are described in outline.

First, to start the operations for sales data processing, the operator performs a login operation by pressing the number keys 21 to input an operator number.

The sales data processing device 10 checks whether or not the inputted operator number is registered. If the number is registered, the sales data processing device 10 executes login processing. If the number is not registered, the sales data processing device 10 blocks the login processing. During the login, the sales data processing device 10 stores the operator number in internal memory (a storage unit 40 shown in FIG. 3, which is described below, or the like).

When the login processing is executed, the operator may use one or more functions specified in advance. That is, the operator may perform various key operations at the sales data processing device 10 in accordance with such functions.

FIG. 2 is a diagram showing examples of the functions in a table format. In the table of FIG. 2, a row corresponds with a single function. That is, in a row, the item in the first column describes a code that uniquely represents the function related to that row (hereinafter referred to as the "function code"). The item in the second column of the row describes the name of the function related to the row (hereinafter referred to as the "function name"). The item in the third column of the row describes specific details of the function related to the row (hereinafter referred to as the "function details").

For example, it is apparent that the function in the first row has a function code of "0001" and a function name of "prepare change". It is also apparent that the function details of prepare change are: "Used when putting change into the sales data processing device 10 before the store opens. The total value of the prepared change is inputted with the number keys 21, the "prepare change" key of the function keys 22 is pressed, and the drawer 25 opens automatically. The change is put into the drawer 25, and the drawer 25 is closed by hand."

The prepare change key refers to a key among the function keys 22 on which the function name "prepare change" is printed. Hereinafter, other keys among the function keys 22 are referred to with the function names printed thereon as prefixes.

Now, as a specific example of the various key operations associated with the functions, for a case in which a customer is purchasing a first product with a price of ¥500 and a second product with a price of ¥250, a sequence of key operations to register the amount paid by the customer as a sales amount for the store is described.

In this case, the operator presses the number keys 21 or the like and inputs the number 500 as the price of the first product. Similarly, the operator presses the number keys 21 or the like and inputs the number 250 as the price of the second product. In response, the sales data processing device 10 stores the price of ¥500 for the first product and the price of ¥250 for the second product in the internal memory.

Although not illustrated, the sales data processing device 10 may have a constitution in which respective keys are assigned to respective products and the prices of the products are acquired from inside or outside the sales data processing device 10. With a sales data processing device 10 that has this constitution, the operator presses the key assigned to the first product instead of the number keys 21. The operator similarly presses the key assigned to the second product. In response, the sales data processing device 10 acquires the price of ¥500 for the first product and the price of ¥250 for the second product and stores the prices in the internal memory.

Then, the operator assigns a discount of ¥50 from the total price of the first and second products. In this case, the function in the second row of FIG. 2, the "discount" function, is carried out by the operator.

Specifically, according to the function details for "discount" in the second row, the operator presses the number keys 21 or the like and inputs the number 50 as the discount amount during the input of the products being sold (during the input of the prices of the products). In response, the sales data processing device 10 stores the discount amount (−¥50 in the present example) in the internal memory together with the prices of the products (in the present example, ¥500 yen for the first product and ¥250 for the second product).

Then, the operator presses the discount key among the function keys 22. Accordingly, the sales data processing device 10 recognizes that the discount function is being carried out, subtracts the discount amount from the total inputted hitherto, and displays the result of the subtraction at the display unit 23. Specifically, in the present example, the sales data processing device 10 calculates ¥500 (the price of the first product) plus ¥250 (the price of the second product) minus ¥50 (the discount), and displays an image showing the result of this calculation, ¥700, at the display unit 23 (i.e., an image of the number 700).

The customer who is purchasing the first and second products may see an amount to be paid on the display of the display unit 23 of the sales data processing device 10. For example, the above-mentioned ¥700 is displayed at the display unit 23 as the amount to be paid, and the customer gives ¥1000 cash to the operator. In other words, the operator receives ¥1000 from the customer as a submitted amount.

At this time, the function in the third row of FIG. 2, the "cash" function, is carried out by the operator.

Specifically, according to the function details for "cash" in the third row, the operator presses the number keys 21 or the like to input the number 1000 as the amount submitted by the customer, and presses the cash key among the function keys 22.

In response, the sales data processing device 10 recognizes that the cash function is being carried out, subtracts the amount to be paid from the submitted amount, and displays the result of the subtraction at the display unit 23 as a change amount. Specifically, in this example, the sales data processing device 10 calculates ¥1000 (the submitted amount) minus ¥700 (the amount to be paid, which is the price of the first product plus the price of the second product minus the discount), and displays an image representing the result of the calculation, which is a change amount of ¥300, at the display unit 23 (i.e., an image of the number 300).

Then, the sales data processing device 10 automatically opens the drawer 25. The operator deposits the submitted ¥1000 in the drawer 25, takes ¥300 change from the drawer 25, and gives the change to the customer. When the operator has given the change to the customer, the operator ends the cash function and closes the drawer 25 by hand.

At this time, the sales data processing device 10 registers (stores) ¥700 in the internal memory as a sale for the store. The sales data processing device 10 also saves a log of the above-described operations for sales data processing (hereinafter referred to as the "operation history"). A location to which the operation history is saved is not particularly limited, and may be a device outside the sales data processing device 10 (an unillustrated server or the like). However, in the present embodiment, the internal memory (the below-described storage unit 40 of FIG. 3 or the like) is employed.

Herein, functions may be broadly divided into functions not associated with opening of the drawer 25 such as the aforementioned "discount" and functions associated with opening of the drawer 25 such as the aforementioned "cash". Accordingly, in the present embodiment, a flag is employed to clearly distinguish between these two kinds of functions. The flag is set to "zero" for functions not associated with opening of the drawer 25 and is set to "one" for functions associated with opening of the drawer 25. This flag is referred to hereinafter as the "drawer automatic opening flag".

A function for which the drawer automatic opening flag is "one" is carried out by a combination of typical operations by the operator. For example, directly considering opening and closing of the drawer 25, a typical operation of a press of the function keys 22 is carried out to open the drawer 25 and subsequently a typical operation of closing the opened drawer 25 by hand is carried out. A single typical operation or a combination of plural typical operations for such a function can be considered as being a standard operation for the function. Hereinafter, therefore, a single typical operation or combination of plural typical operations for a function is referred to as a "standard operation of the function".

If the standard operation of a function is carried out in the normal manner, an opening-to-closing duration of the drawer 25 associated with the function should be shorter than a certain duration, though there will be some level of personal difference between operators. That is, even though an operation is the standard operation of a function, if an opening-to-closing duration of the drawer 25 is above the certain duration, then an operation with which there is a suspicion of cash being improperly taken from the drawer 25, which is to say an irregular drawer operation, is being carried out.

Further, if the standard operation of a function is carried out in the normal manner, a count of occurrences of opening-and-closing of the drawer 25 associated with the function should be less than a certain frequency, though there will be some level of personal difference between operators. That is, even though an operation is the standard operation of a function, if an opening-and-closing count of the drawer 25 is above the certain frequency, then an operation with which there is a suspicion of cash being improperly taken from the drawer 25, which is to say an irregular drawer operation, is being carried out.

Accordingly, for the standard operation of a function, references for determining whether or not irregular drawer operations are being carried out—a certain duration for opening-to-closing durations of the drawer 25 and a certain count for an opening-and-closing count of the drawer 25, or the like—may be set in advance.

A function is executable when a function key is pressed. Thus, a pressing operation for a function for which the drawer automatic opening flag is "one" may be identified as being an operation that opens the drawer 25.

For each operation that opens the drawer 25 with which this is identified, references for the standard operation of the function that is executed by that operation may be set in advance.

In this case, the sales data processing device 10 may execute a sequence of processing as follows. The sales data processing device 10 acquires the history of operations by the operator.

Then, from references of standard operations set in advance for each operation that opens the drawer 25, the sales data processing device 10 acquires standard operation references for operations specified in the history.

For each operation specified in the history, the sales data processing device 10 finds differences from the acquired standard operation references, and if there is a difference above a predetermined level, detects an operation as being an irregular drawer operation.

This sequence of processing is referred to hereinafter as drawer irregularity detection processing.

If there is a likelihood of plural operators performing operations at the sales data processing device 10, standard operation references may be uniformly set for all the operators. However, because of individual differences between the operators, misdetections may occur or, on the other hand, reliable detection may be difficult.

Therefore, in the present embodiment, standard operation references are individually set for each operator. Thus, misdetections may be reduced and reliable detection realized.

FIG. 3 is a block diagram illustrating hardware structure of the sales data processing device 10 that is capable of executing the drawer irregularity detection processing.

The sales data processing device 10 is provided with a central processing unit (CPU) 31, read-only memory (ROM) 32, random access memory (RAM) 33, a bus 34, an input/output interface 35, an input unit 36, an output unit 37, a drawer control unit 38, a sensor unit 39, the storage unit 40, a communication unit 41 and a drive 42.

The CPU 31 executes various types of processing according to programs that are recorded in the ROM 32 or that are loaded from the storage unit 40 to the RAM 33.

The RAM 33 stores data and the like necessary for the CPU 31 to execute the various processes, as appropriate.

The CPU 31, the ROM 32 and the RAM 33 are connected to one another via the bus 34. The input/output interface 35 is also connected with the bus 34. The input unit 36, the output unit 37, the drawer control unit 38, the sensor unit 39, the storage unit 40, the communication unit 41 and the drive 42 are connected to the input/output interface 35.

The input unit 36 is configured by various buttons, switches and the like, including the aforementioned number keys 21 and function keys 22. The input unit 36 inputs various kinds of information in accordance with operations by operators.

The output unit 37 includes the aforementioned display unit 23 and printing unit 24, and outputs various kinds of information.

The drawer control unit 38 implements control to open the drawer 25 in accordance with instructions from the CPU 31. When the drawer 25 has been opened, it is closed by a manual operation by an operator.

The sensor unit 39 is configured by an infrared sensor and the like, and detects opened and closed states of the drawer 25.

The storage unit 40 is configured by a hard disc, dynamic random access memory (DRAM) or the like, and stores various data.

The communication unit 41 controls communication with other devices via a network, which includes the Internet.

A removable medium 71 made from a magnetic disc, an optical disc, a magneto-optical disc, semiconductor memory or the like is installed in the drive 42 as appropriate. Programs read via the drive 42 from the removable medium 71 are installed in the storage unit 40 as necessary.

FIG. 4 is a function block diagram illustrating, of functional structure of the sales data processing device 10 that includes these constituent elements, functional structures for implementing history generation processing and the aforementioned drawer irregularity detection processing.

The term "history generation processing" as used herein includes a sequence of processing that generates and records history information representing a log of register operations by an operator (including a log of opening and closing of the drawer 25).

The CPU 31 performs the functions of a main control unit 101, a history information generation unit 102, a drawer irregularity detection unit 103 and an irregularity information output control unit 104.

A reference information storage portion 131, an operation history information storage portion 132, an opening/closing history information storage portion 133 and a unified history information storage portion 134 are provided as regions of the storage unit 40.

The main control unit 101 controls overall operations of the sales data processing device 10 when the history generation processing and the aforementioned drawer irregularity detection processing are being executed.

The history information generation unit 102 is provided with an operation history information generation unit 111 and an opening/closing history information generation unit 112, for executing the history generation processing.

Each time an arbitrary key among the function keys 22 is pressed by an operator, the operation history information generation unit 111 generates operation history information representing a log of operations relating to the function corresponding to the pressed key, and saves the operation history information in the operation history file illustrated in FIG. 5.

FIG. 5 is a diagram showing an example of structure of an operation history file. In FIG. 5, a row corresponds to the operation history information generated by the operation history information generation unit 111 when an arbitrary key among the function keys 22 is pressed. The operation history information is constituted as an aggregation of data including date, time, function code, function name, drawer automatic opening flag, operator and amount.

The date and time are data representing the date and time at which the arbitrary key among the function keys 22 was pressed. The function code and function name are data representing the function code and function name of the function related with the pressed key, which correspond with those in the table of FIG. 2 described above. The drawer automatic opening flag is the flag that is set to "one" if the function related to the pressed key is of a type associated with opening of the drawer 25 and set to "zero" if the function is of a type that is not associated with opening of the drawer 25. The operator is data representing the name of the operator who pressed the arbitrary key of the function keys 22. The amount is data representing an amount of money, which is inputted with the number keys 21 or the like during or before or after the function related with the pressed key.

Looking again at FIG. 4, when the drawer 25 is opened and closed, the opening/closing history information generation unit 112 generates drawer opening/closing history information representing a log, on the basis of detection results from the sensor unit 39, and saves the drawer opening/closing history information in the drawer opening/closing history file illustrated in FIG. 6.

FIG. 6 is a diagram showing an example of structure of a drawer opening/closing history file. In FIG. 6, a row corresponds to the drawer opening/closing history information generated by the opening/closing history information generation unit 112 at a time when the drawer 25 is opened or closed. The drawer opening/closing history information is constituted as an aggregation of data including date, time and opening/closing.

The date and time are data representing the date and time at which the opening or closing of the drawer 25 was detected by the sensor unit 39. "Opening/closing" is data representing whether the drawer 25 was opened or closed. Specifically, when the drawer 25 is opened, "opened" is used as the data for opening/closing, and when the drawer 25 is closed, "closed" is used as the data for opening/closing.

Looking again at FIG. 4, the drawer irregularity detection unit 103 is provided with a history information acquisition unit 121, a reference information acquisition unit 122 and an irregularity detection unit 123, for executing the drawer irregularity detection processing.

That is, if the logged-in operator is identified as a person with the authority to carry out the drawer irregularity detection processing such as, for example, a store manager or the like, the main control unit 101 performs the functions of the history information acquisition unit 121, the reference information acquisition unit 122 and the irregularity detection unit 123 in order to execute the drawer irregularity detection processing.

From each set of operation history information in the history information file stored at the operation history information storage portion 132 (see FIG. 5), the history information acquisition unit 121 acquires operation history information for functions associated with opening of the drawer 25, that is, operation history information for which the drawer automatic opening flag is "one".

The history information acquisition unit 121 also acquires all sets of drawer opening/closing history information in the drawer opening/closing history file stored at the opening/closing history information storage portion 133 (see FIG. 6).

Then, the history information acquisition unit 121 unifies the acquired operation history information and drawer opening/closing history information, sorting them into a time series, and includes the same in a newly created file. This newly created file is hereinafter referred to as the "intermediate merge file".

The history information acquisition unit 121 totals up occurrence counts of the functions from the operation history file stored at the operation history information storage portion 132, for each operator and for each function, and includes the totals in a newly created file. This newly created file is hereinafter referred to as the "count totals file".

The intermediate merge firm and the count totals file are stored at the unified history information storage portion 134 in the present embodiment. Hereinafter, the intermediate merge file and the count totals file are collectively referred to as unified history files.

FIG. 7A and FIG. 7B are diagrams showing examples of structure of the unified history files. Specifically, FIG. 7A is a diagram showing an example of structure of the intermediate merge file, and FIG. 7B is a diagram showing an example of structure of the count totals file.

In FIG. 7A, a row of the intermediate merge file corresponds with operation history information or drawer opening/closing history information acquired by the history information acquisition unit 121.

Thus, the data in each item of the row corresponds with the data of the corresponding item in the operation history information (see FIG. 5) or the drawer opening/closing history information (see FIG. 6). These data are described above, so are not described here.

In FIG. 7B, a row of the count totals file corresponds with a function by an operator, and is constituted as an aggregation of data including date, operator, function name and occurrence count.

The date in the row is data representing a date at which the operation history file that is the subject of totalling was generated. The operator and function name in the row are data representing the name of the operator and the function name related with that row. The occurrence count is data representing a frequency of occurrence of the function, for the combination of operator and function related with the row.

Looking again at FIG. 4, the reference information acquisition unit 122 acquires standard operation references for operations (functions) specified in the unified history files (see FIG. 7A and FIG. 7B), from the standard operation references set in advance for each operation that opens the drawer 25.

In the present embodiment, a standard operation duration and a standard operation count that are set for each operator and each function are used as the standard operation references. More specifically, in the present embodiment, a duration that is permitted as a duration for which the drawer 25 is continuously left open (hereinafter referred to as the drawer opening permitted duration) is used as the standard operation duration, and a count that is permitted as a number of times opening and closing of the drawer 25 is repeated (hereinafter referred to as the drawer opening permitted count) is used as the standard operation count.

These standard operation references, which is to say the drawer opening permitted duration and drawer opening permitted count for each operator and each function in the present embodiment, are saved in a predetermined table and stored in advance at the reference information storage portion 131. Hereinafter, this predetermined table is referred to as the drawer opening/closing management table.

FIG. 8 is a diagram showing an example of structure of the drawer opening/closing management table. In FIG. 8, a row corresponds with an operator and a function, and is constituted as an aggregation of data including the operator, function name, drawer opening permitted duration and drawer opening permitted count.

The operator and function name of the row are data representing the name of the operator and the function name related with that row. The drawer opening permitted duration is data representing the drawer opening permitted duration for the combination of operator and function related with the row. The drawer opening permitted count is data representing the drawer opening permitted count for the combination of operator and function related with the row.

The drawer opening permitted count is set to a maximum value of 9999 for the combination of "Ito" and "cash" in the top row of FIG. 8, and for the combination of "Yoshida" and "cash" in the tenth row from the top. The maximum value being set as the drawer opening permitted count means that there is no limit on the number of times opening and closing of the drawer 25 is repeated (that the drawer operation will not be determined to be irregular however many times the drawer is opened and closed). Similarly, although not illustrated, a maximum value being set as the drawer opening permitted duration means that there is no limit on a continuous duration of opening of the drawer 25 (that the drawer operation will not be determined to be irregular however long the drawer is left open).

On the other hand, if the drawer opening permitted duration or drawer opening permitted count in a row is set to 0, this means that the operator corresponding with that row is not permitted to carry out the function corresponding with the row.

As a login operation in the present embodiment, an operator inputs an operator code specified for themself. A file that manages operator codes for respective operators is also stored in advance at the reference information storage portion 131. Hereinafter, this file is referred to as the operator master file.

FIG. 9 is a diagram showing an example of structure of the operator master file. In FIG. 9, a row corresponds with an operator, and is constituted as an aggregation of data including the operator code and the operator. The operator code and operator in the row are data representing, respectively, the operator code and name of the operator related with that row.

In the present embodiment, a file including information on functions that can be executed using the sales data processing device 10 is also stored in advance at the reference information storage portion 131. This file is hereinafter referred to as the function master file.

FIG. 10 is a diagram showing an example of structure of the function master file.

In FIG. 10, a row corresponds with a function, and is constituted as an aggregation of data including a function code, function name, drawer automatic opening flag and so forth.

The function code and function name in the row are data representing, respectively, the function code and function name of the function related with that row. The drawer automatic opening flag is the flag that is set to "one" if the function related with that row is associated with opening of the drawer 25, and is set to "zero" if the function is not associated with opening of the drawer 25.

Looking again at FIG. 4, the irregularity detection unit 123 finds differences between the operation history file (see FIG. 7) and the acquired standard operation references (the drawer opening permitted duration and drawer opening permitted count in the drawer opening and closing management table in FIG. 8) for each combination of operator and function specified in the operation history file. If there is a difference of a least a predetermined level, an irregular drawer operation is detected.

Details of the detection of irregular drawer operations by the irregularity detection unit 123 are described below with reference to FIG. 15 to FIG. 19.

The irregularity information output control unit 104 generates information for reporting an irregular drawer operation detected by the irregularity detection unit 123 (hereinafter referred to as irregularity information), and performs control such that the irregularity information is outputted through the output unit 37.

For example, the irregularity information output control unit 104 controls the printing unit 24 of the output unit 37 to print the irregularity information onto a paper medium as illustrated in FIG. 11A and FIG. 11B. The irregularity information printed onto the paper medium is hereinafter referred to as the drawer opening irregularity report.

FIG. 11A and FIG. 11B are diagrams showing examples of drawer opening irregularity reports. Specifically, FIG. 11A is a diagram showing an example of a drawer opening duration irregularity report, and FIG. 11B is a diagram showing an example of a drawer opening count irregularity report.

As shown in FIG. 11A, various kinds of information on cases in which an irregular opening duration of the drawer 25 has been detected are printed in the drawer opening duration irregularity report to show irregular drawer operations.

Specifically, the following are printed: a date and time at which the irregularity was detected; the name of the operator with whom the irregularity occurred; the function name that is the subject of the irregularity; the money amount inputted at the time of the irregularity; and the opening duration of the drawer 25 at the time of the irregularity (the irregular duration).

As shown in FIG. 11B, various kinds of information on cases in which an irregular opening-and-closing count of the drawer 25 has been detected are printed in the drawer opening count irregularity report to show irregular drawer operations.

Specifically, the following are printed: a date and time at which the irregularity was detected; the name of the operator with whom the irregularity occurred; the function name that is the subject of the irregularity; and the opening-and-closing count of the drawer 25 at the time of the irregularity (the irregular count).

Next, various kinds of processing at the sales data processing device 10 with the functional structure in FIG. 4 are described with reference to the flowcharts in FIG. 12 to FIG. 19.

Figure 12:
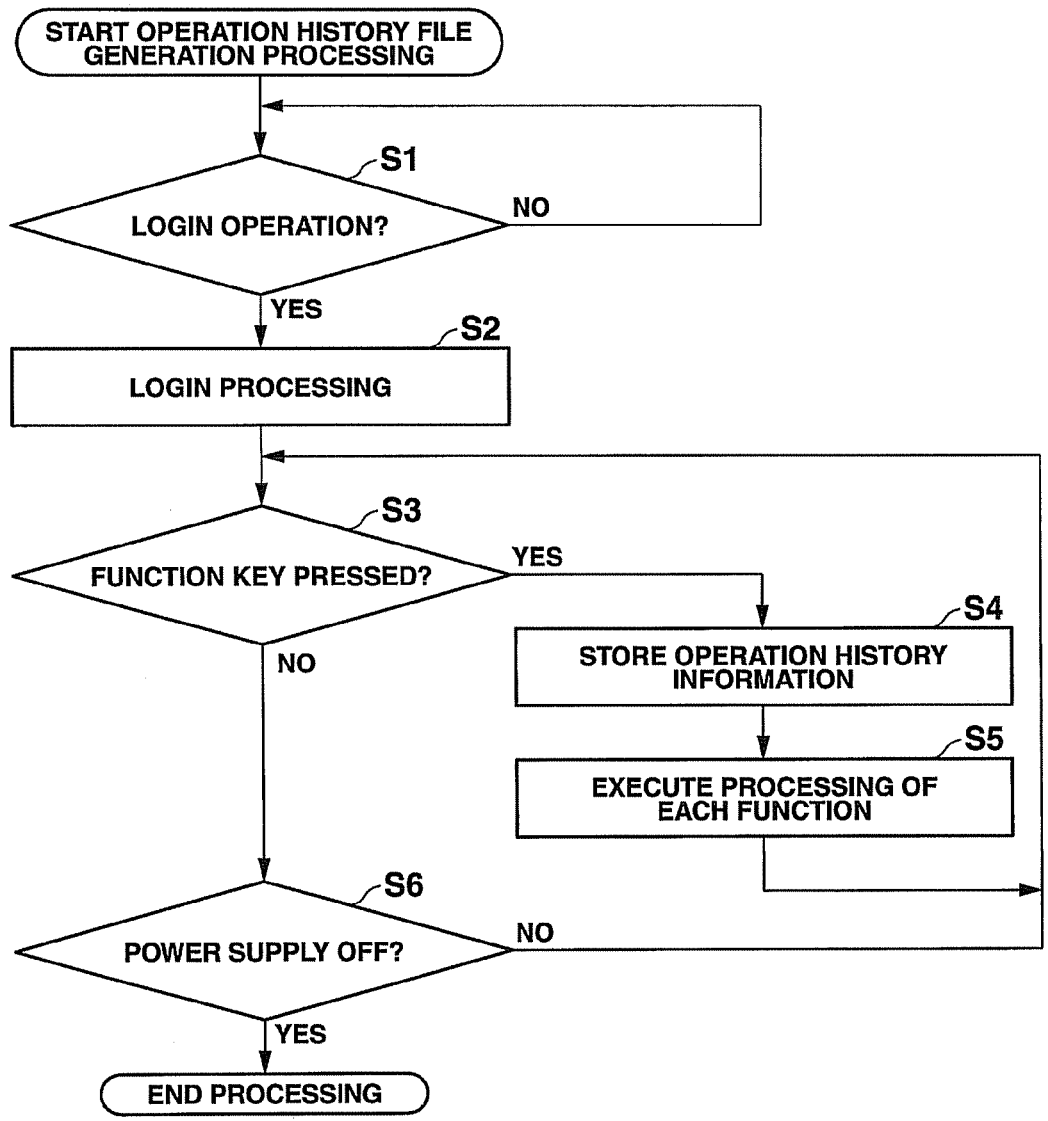
FIG. 12 is a flowchart describing an example of flow of processing that generates an operation history file, in the history generation processing that is executed by the sales data processing device of FIG. 3 and FIG. 4.

FIG. 12 is a flowchart describing an example of a flow of processing that generates the operation history file (hereinafter referred to as operation history file generation processing), in the history generation processing that is executed by the sales data processing device 10.

When the operation history file generation processing is executed, the CPU 31 functions as the functional blocks in FIG. 4 and executes the following processing. That is, in hardware, the CPU 31 corresponds to the main actor of the processing in the following steps. However, for ease of understanding of the present invention, the processing of the steps that follow is described with the functional blocks implemented by the CPU 31 being treated as the main actors.

In step S1, the main control unit 101 makes a determination as to whether a login operation has been performed by an operator.

If it is determined that no login operation has been performed by an operator, the result of the determination in step S1 is NO and the processing returns to step S1. This means that the determination processing of step S1 is repeatedly executed until a login operation is performed by an operator. Then, when a login operation is performed by an operator, the result of the determination in step S1 is YES, and the processing advances to step S2.

In step S2, the main control unit 101 executes login processing. For example, if the operator code inputted in the login operation is 0001, the main control unit 101 recognizes the operator registered with the name "Arimori" (see FIG. 9), and permits login by the operator.

In step S3, the operation history information generation unit 111 makes a determination as to whether any of the function keys 22 has been pressed. If none of the function keys 22 have been pressed, the result of the determination in step S3 is NO and the processing advances to step S6.

In step S6, the main control unit 101 makes a determination as to whether a power supply of the sales data processing device 10 is off. If the power supply is on, the result of the determination in step S6 is NO, the processing returns to step S3, and the processing is subsequently repeated. That is, while the power supply is on, if none of the function keys 22 is pressed, a processing loop of step S3

(NO) and step S6 (NO) is repeated, and the operation history file generation processing is in a standby state.

If the power supply is turned off at this time, the result of the determination in step S6 is YES, and the operation history file generation processing ends.

Alternatively, if the power supply is kept on and one of the function keys 22 is pressed, the result of the determination in step S3 is YES and the processing advances to step S4.

In step S4, the operation history information generation unit 111 acquires operation history information and stores it in the operation history file (see FIG. 5).

Specifically, the operation history information generation unit 111 acquires the following as operation history information and stores the same in the operation history file: a date and time at which the operator presses the function keys 22; the function code and name of the function corresponding with the key of the function keys 22 that is pressed; the drawer automatic opening flag; the operator name; and the inputted amount.

In step S5, the main control unit 101 executes processing of the function corresponding to the pressed key of the function keys 22. If the function is of a type associated with opening of the drawer 25, that is, if the drawer automatic opening flag is "one", the main control unit 101 opens the drawer 25, via the drawer control unit 38. The temporarily opened drawer 25 is closed by a manual operation by the operator. Thereafter, the processing returns to step S3 and the subsequent processing is repeated. In other words, each time any of the function keys 22 is pressed by the operator, a processing loop of step S3 (YES), step S4 and step S5 is repeatedly executed, and the operation history information acquired each time is added to the operation history file (stored). Thereafter, when the power supply is turned off, the operation history file generation processing ends.

During this processing, each time opening and closing of the drawer 25 is detected by the sensor unit 39, the opening/closing history information generation unit 112 generates drawer opening/closing history information and stores the same in the drawer opening/closing history file (see FIG. 6).

Figure 13:
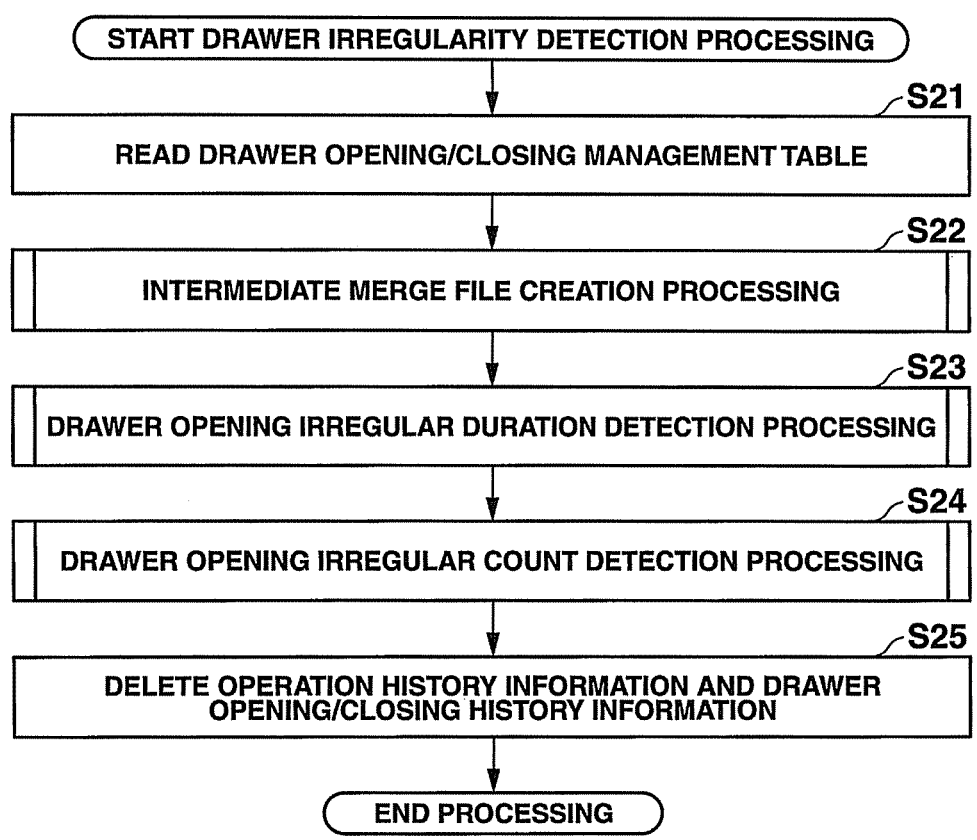
FIG. 13 is a flowchart describing an example of flow of the drawer irregularity detection processing.

Next, the drawer irregularity detection processing is described with reference to FIG. 13. FIG. 13 is a flowchart describing an example of flow of the drawer irregularity detection processing. The drawer irregularity detection processing is started, for example, during the execution of settlement processing by the sales data processing device 10 after a day's business has ended and a store manager or the like has logged into the sales data processing device 10 as an operator.

When the drawer irregularity detection processing is executed, the CPU 31 functions as the functional blocks in FIG. 4 and executes processing as follows. That is, in hardware, the CPU 31 corresponds to the main actor of the processing in the following steps. However, for ease of understanding of the present invention, the processing of the steps that follow is described with the functional blocks implemented by the CPU 31 being treated as the main actors.

in step S21, the reference information acquisition unit 122 reads the drawer opening/closing management table (see FIG. 8) from the reference information storage portion 131.

In step S22, the history information acquisition unit 121 executes processing that creates the intermediate merge file (hereinafter referred to as intermediate merge file creation processing). Details of the intermediate merge file creation processing are described below with reference to FIG. 14.

In step S23, the irregularity detection unit 123 executes processing that detects irregular durations of drawer opening (hereinafter referred to as drawer opening irregular duration detection processing). Details of the drawer opening irregular duration detection processing are described below with reference to FIG. 15 to FIG. 17.

In step S24, the irregularity detection unit 123 executes processing that detects irregular counts of drawer opening (hereinafter referred to as drawer opening irregular count detection processing). Details of the drawer opening irregular count detection processing are described below with reference to FIG. 18 and FIG. 19.

In step S25, the main control unit 101 deletes the operation history information and the drawer opening/closing history information.

Hence, the drawer irregularity detection processing ends.

Next, the intermediate merge file creation processing is described with reference to FIG. 14.

Figure 14:
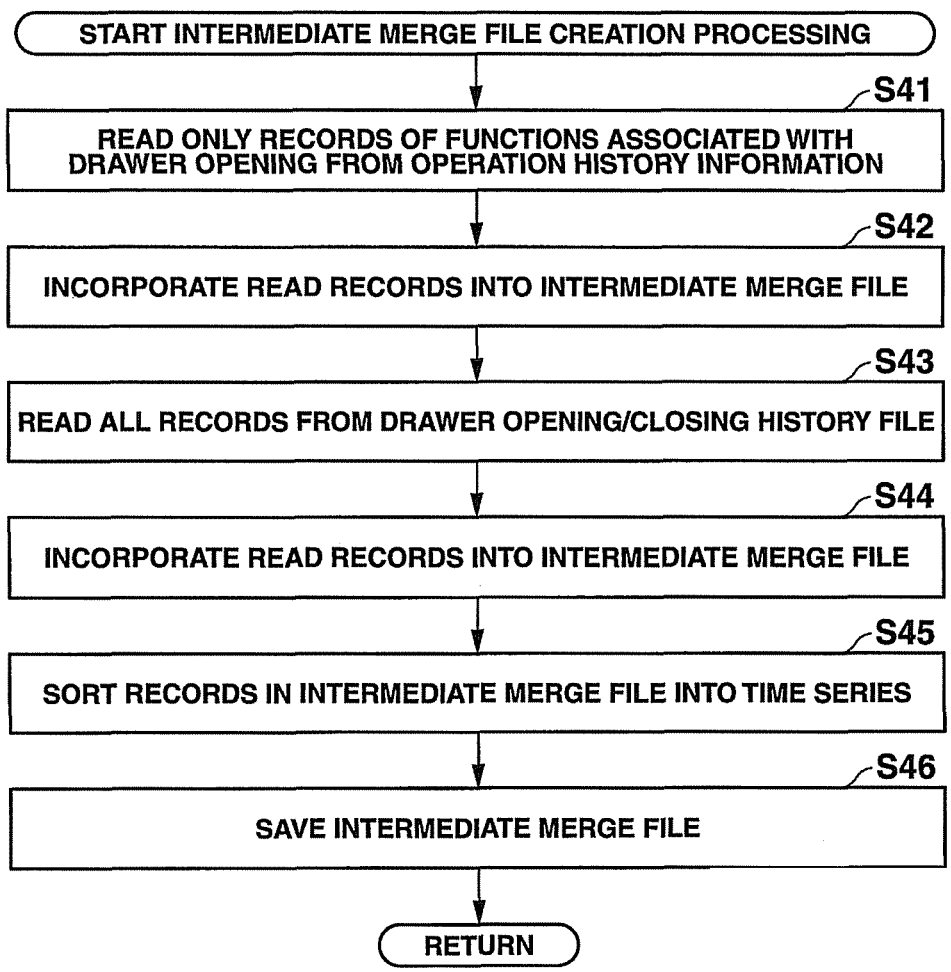
FIG. 14 is a flowchart describing an example of detailed flow of intermediate merge file creation processing in step S22 of the drawer irregularity detection processing in FIG. 13.

FIG. 14 is a flowchart describing an example of detailed flow of the intermediate merge file creation processing in step S22 of the drawer irregularity detection processing in FIG. 13.

In step S41, the history information acquisition unit 121 reads only the records (operation history information) of functions associated with opening of the drawer 25 from the operation history file stored at the operation history information storage portion 132.

Specifically, the history information acquisition unit 121 reads only operation history information (records) in which the drawer automatic opening flag is "one" from the operation history information contained in the operation history file.

Referring to the example in FIG. 5, the history information acquisition unit 121 reads the respective operation history information (records) of the functions "prepare change", "cash" and "exchange".

In step S42, the history information acquisition unit 121 incorporates the read records (operation history information) into the intermediate merge file at the unified history information storage portion 134.

In step S43, the history information acquisition unit 121 reads all records (drawer opening/closing history information) from the drawer opening/closing history file stored at the opening/closing history information storage portion 133. Referring to the example in FIG. 6, the history information acquisition unit 121 reads all eight rows (records) of the drawer opening/closing history information.

In step S44, the history information acquisition unit 121 incorporates the acquired records into the intermediate merge file at the unified history information storage portion 134.

in step S45, the history information acquisition unit 121 sorts the records in the intermediate merge file at the unified history information storage portion 134 (the operation history information associated with the opening of the drawer 25 and the drawer opening/closing history information) into a time series. Thus, as an example, the intermediate merge file shown in FIG. 7A is created.

In step S46, a history information generation unit 102 stores the intermediate merge file that has been sorted by the processing of step S45 (see FIG. 7A) in the unified history information storage portion 134.

Hence, the intermediate merge file creation processing ends. Thereafter, the processing advances to the drawer, opening irregular duration detection processing of step S23 in FIG. 13.

The drawer opening irregular duration detection processing is now described with reference to FIG. 15 and FIG. 16.

Figure 15:
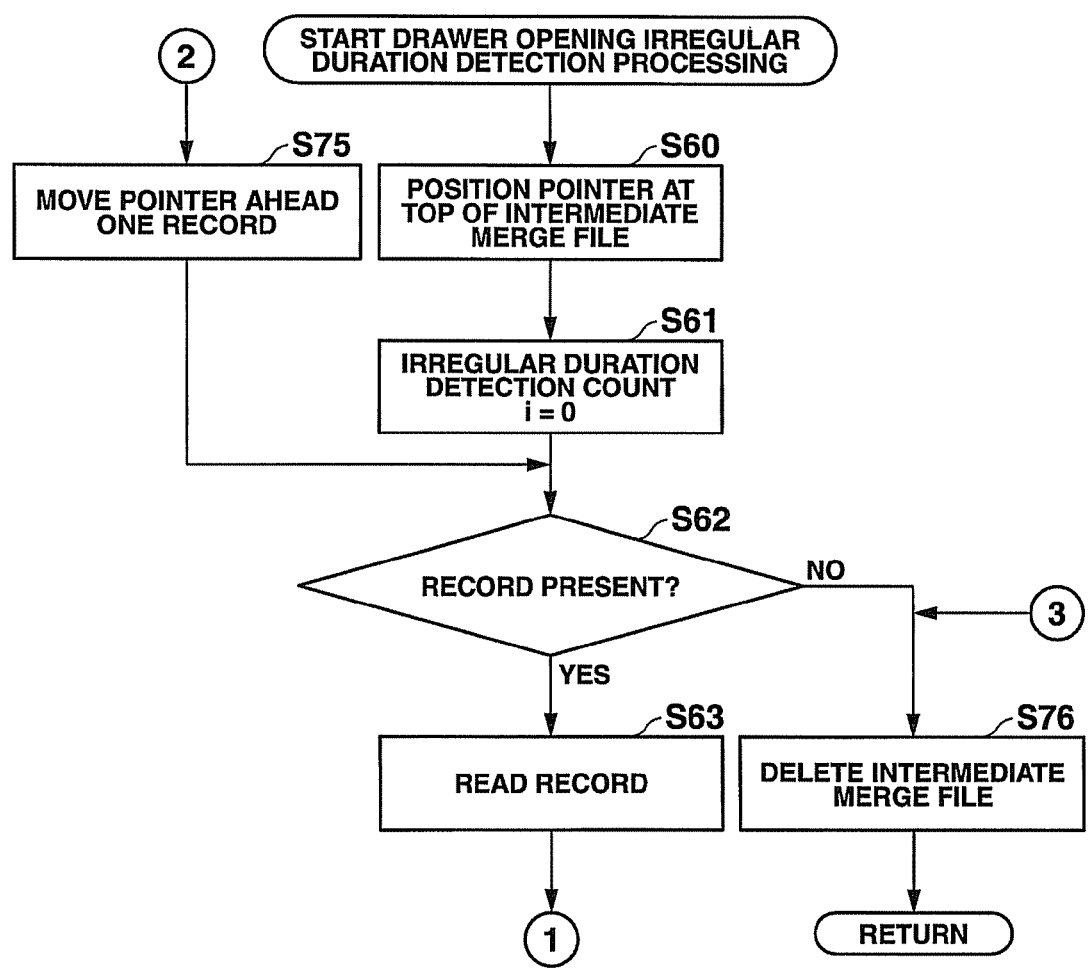
FIG. 15 is a flowchart describing an example of detailed flow of drawer opening irregularity duration detection processing in step S23 of the drawer irregularity detection processing in FIG. 13.
Figure 16:
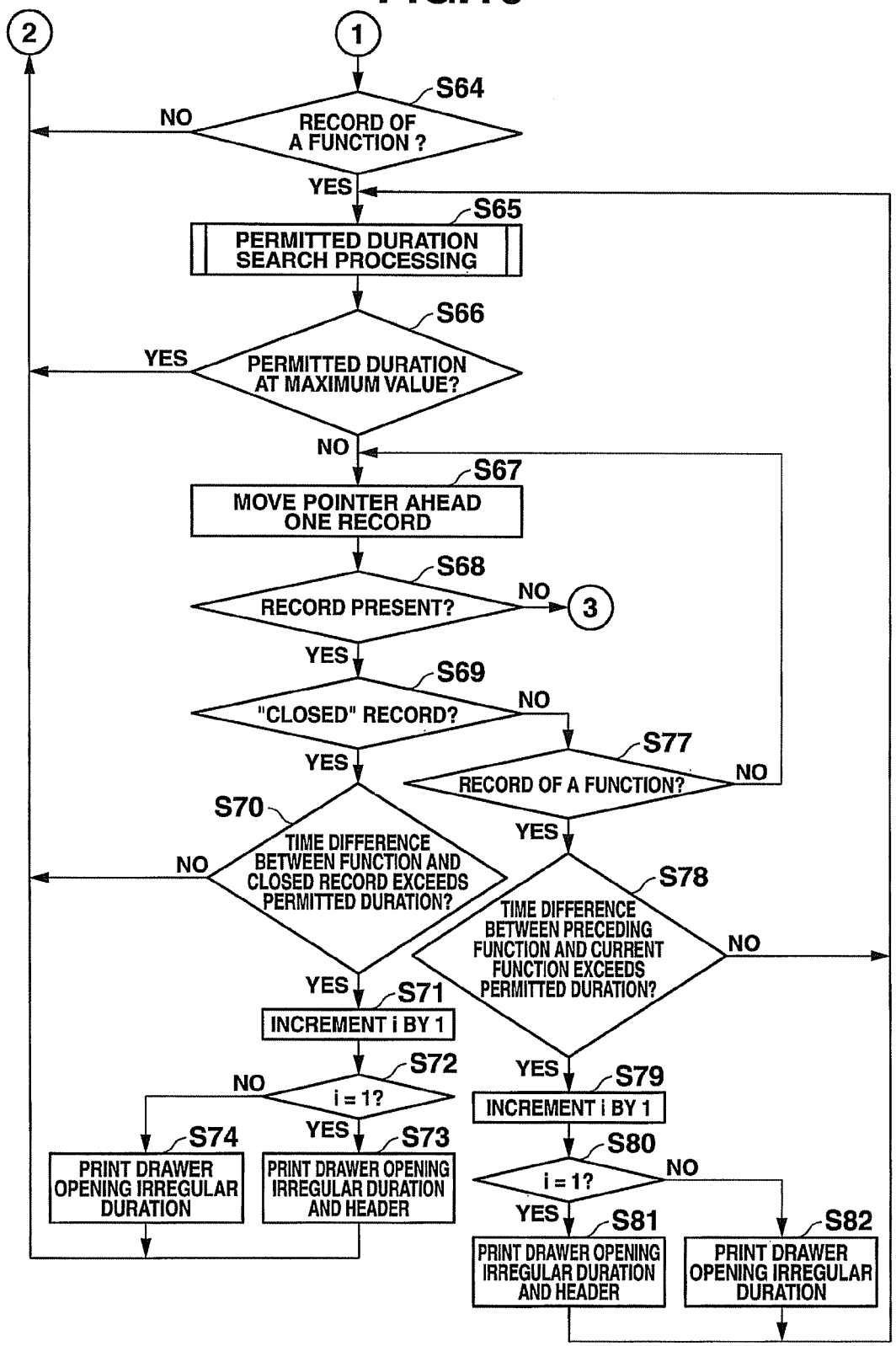
FIG. 16 is a flowchart describing the example of detailed flow of the drawer opening irregularity duration detection processing in step S23 of the drawer irregularity detection processing in FIG. 13.

FIG. 15 and FIG. 16 are a flowchart describing an example of detailed flow of the drawer opening irregular duration detection processing in step S23 of the drawer irregularity detection processing in FIG. 13.

In step S60, the irregularity detection unit 123 positions a pointer at the top row of the intermediate merge file. The pointer indicates a reading target row (a record).

In step S61, the irregularity detection unit 123 initializes an irregular duration detection count i to zero. The irregular duration detection count i is described below.

In step S62, the irregularity detection unit 123 makes a determination as to whether there is a record at the position indicated by the pointer in the intermediate merge file.

If there is no record, the result of the determination in step S62 is NO, and the processing advances to step S76. The processing from step S76 onward is described below.

On the other hand, if there is a record, the result of the determination in step S62 is YES, and the processing advances to step S63.

In step S63, the irregularity detection unit 123 reads the record indicated by the pointer from the intermediate merge file.

As a specific example, the pointer is positioned at the fourth row from the top of the intermediate merge file in FIG. 7A. In this case, the irregularity detection unit 123 reads the fourth record, which is a record of a combination of the function "cash" and the operator "Ito".

In step S64 in FIG. 16, the irregularity detection unit 123 makes a determination as to whether the record that has been read is a record of a function.

If the record that has been read is a record originally from the drawer opening/closing history file, it is a record representing opening/closing of the drawer 25 (an "opened" record or "closed" record). Therefore, the result of the determination in step S64 is NO, and the processing advances to step S75. The processing from step S75 onward is described below.

On the other hand, if the record that has been read is a record originally from the operation history file, it is a record of a function. Therefore, the result of the determination in step S64 is YES, and the processing advances to step S65. In the example mentioned above, in which the record at the fourth row of the intermediate merge file of FIG. 7A is read, the record is a record of the function "cash". Therefore, the result of the determination in step S64 is YES and the processing advances to step S65

In step S65, the irregularity detection unit 123 searches the drawer opening/closing management table for a drawer opening permitted duration for the operator and function corresponding to the record read by the processing of step S63.

The sequence of processing in step S65 is hereinafter referred to as "permitted duration search processing". Details of the permitted duration search processing are described below with reference to FIG. 17.

In the example mentioned above, in which the fourth record of the intermediate merge file in FIG. 7A is read, because the record is the combination of the function "cash" and the operator "Ito", the search finds, in the first row of the drawer opening/closing management table of FIG. 8, a drawer opening permitted duration of 30 seconds.

In step S66, the irregularity detection unit 123 makes a determination as to whether the drawer opening permitted duration is the maximum value.

The meaning of the drawer opening permitted duration being the maximum value is that there is no limit on the opening duration of the drawer 25 for the combination of operator and function corresponding with the record read by the processing of step S63. In such a case, the result of the determination in step S66 is YES, and the processing advances to step S75 of FIG. 15. The processing from step S75 onward is described below.

On the other hand, if the drawer opening permitted duration is not the maximum value, the result of the determination in step S66 is NO, and the processing advances to step S67. In the example mentioned above, in which the drawer opening permitted duration of 30 seconds is found in the first row of the drawer opening/closing management table of FIG. 8, the result of the determination in step S66 is NO and the processing advances to step S67.

In step S67, the irregularity detection unit 123 moves the pointer ahead one record in the intermediate merge file. In the example mentioned above, in which the pointer has been set at the fourth row of the intermediate merge file of FIG. 7A, the pointer moves to the fifth row.

In step S68, the irregularity detection unit 123 makes a determination as to whether there is a record in the intermediate merge file at the position indicated by the pointer.

If there is no record, the result of the determination of step S68 is NO, and the processing advances to step S76 of FIG. 15. The processing from step S76 onward is described below.

On the other hand, if there is a record, the result of the determination in step S68 is YES, and the processing advances to step S69.

In step S69, the irregularity detection unit 123 makes a determination as to whether the record that has been read is a "closed" record.

If the read record is an "opened" record originally from the drawer opening/closing history file (a record indicating opening of the drawer 25) or is a record originally from the operation history file, the result of the determination in step S69 is NO, and the processing advances to step S77. In the example mentioned above, in which the pointer has moved to the fifth row of the intermediate merge file of FIG. 7A, the record in the fifth row is an "opened" record. Therefore, the result of the determination in step S69 is NO and the processing advances to step S77.

In step S77, the irregularity detection unit 123 makes a determination as to whether the record that has been read is a record of a function.

If the record that has been read is a record of a function, the result of the determination in step S77 is YES, and the processing advances to step S78. The processing from step S78 onward is described below.

On the other hand, if the record that has been read is not a "closed" record (the result of the determination in step S69 was NO) and is not a record of a function, which is to say the record is an "opened" record, then the result of the determination in step S77 is NO, the processing returns to step S67 and the subsequent processing is repeated.

In the example mentioned above, in which the pointer has moved to the fifth row of the intermediate merge file in FIG. 7A, the record in the fifth row is an "opened" record. Therefore, the result of the determination in step S77 is NO and the processing returns to step S67. In this case, the pointer moves to the sixth row of the intermediate merge file in FIG. 7A (step S67), there is a record there (YES in step S68), and the record is a record of the function "cash". Thus, the result of the determination in step S77 is YES and the processing advances to step S78.

In step S78, the irregularity detection unit 123 makes a determination as to whether a time difference between the record of the preceding function and the record of the current function exceeds the drawer opening permitted duration.

In other words, the determination processing of step S78 may identify whether the current function was executed with the drawer 25 having been left open since the preceding function without being closed (see the NO result in step S69). Therefore, the time difference between the records of the preceding function and the current function shows a duration for which the drawer 25 was left open, and the determination is made as to whether the duration for which the drawer 25 was left open exceeds the drawer opening permitted duration.

If the duration for which the drawer 25 was left open does not exceed the drawer opening permitted duration, a drawer opening irregular duration has not occurred, the result of the determination in step S78 is NO, the processing returns to step S65, and the subsequent processing is repeated. That is, a drawer opening permitted duration for the current function is found, and the presence or absence of a drawer opening irregular duration is detected on the basis of this drawer opening permitted duration.

On the other hand, if the duration for which the drawer 25 was left open exceeds the drawer opening permitted duration, a drawer opening irregular duration has occurred, the result of the determination in step S78 is YES, and the processing advances to step S79.

In step S79, the irregularity detection unit 123 increments the irregular duration detection count i by 1 (i=i+1).

In step S80, the irregularity detection unit 123 makes a determination as to whether the irregular duration detection count i is 1.

If the irregular duration detection count i is 1, this means that a drawer opening irregular duration has been detected for the first time. If the irregular duration detection count i is 1, the result of the determination in step S80 is YES, and the processing advances to step S81. In step S81, the irregularity information output control unit 104 controls the printing unit 24 to print a header and the detected drawer opening irregular duration. That is, if a drawer opening irregular duration has been detected for the first time, the header is printed as well as the first detected drawer opening irregular duration.

In the example mentioned above, in which the pointer has moved from the fourth row to the sixth row of the intermediate merge file of FIG. 7A, the time difference between the preceding function and the current function is 1 minute (09:22:02.112-09:21:02.012). In comparison, the drawer opening permitted duration is 30 seconds. Therefore, a drawer opening irregular duration has occurred, this is detected, the result of the determination in step S78 is YES, and the processing advances to step S79.

The irregular duration detection count i is updated from 0 to 1 in step S79, and the result of the determination in step S80 is YES. In the processing of step S81, as illustrated in FIG. 11A, a header "Drawer opening duration irregularity report" and the drawer opening irregular duration "2011/3/12 09:21 Ito Cash 60s" are printed out.

On the other hand, if the irregular duration detection count i is not 1, this means that drawer opening irregular durations have been detected two or more times. Accordingly, the result of the determination in step S80 is NO, and the processing advances to step S82. In step S82, the irregularity information output control unit 104 controls the printing unit 24 to print the detected drawer opening irregular duration. That is, if drawer opening irregular durations have been detected two or more times, there is no need to print the header, so only the detected drawer opening irregular duration is printed.

Hereabove, a sequence of processing is described in which the records arranged in a time series in the intermediate merge file have a pattern in which a "closed" record is not sandwiched between two functions.

Next, a sequence of processing is described in which the records arranged in the time series in the intermediate merge file have a pattern in which a "closed" record is sandwiched between two functions. The processing up to step S69 is the same, so is not described here.

When the pointer advances to indicate a closed record, the result of the determination in step S69 is YES, and the processing advances to step S70.

In step S70, the irregularity detection unit 123 makes a determination as to whether a time difference between the record of a function and the "closed" record exceeds the drawer opening permitted duration.

That is, the time difference between the function and the closing represents a duration for which the drawer 25 was left open, and the determination processing of step S70 makes a determination as to whether the duration for which the drawer 25 was left open exceeds the drawer opening permitted duration.

If the duration for which the drawer 25 was left open does not exceed the drawer opening permitted duration, a drawer opening irregular duration has not occurred, the result of the determination in step S70 is NO, and the processing advances to step S75 in FIG. 15.

In step S75, the irregularity detection unit 123 moves the pointer ahead one record in the intermediate merge file. The processing returns to step S62 and the subsequent processing is repeated.

On the other hand, if the duration for which the drawer 25 was left open exceeds the drawer opening permitted duration, a drawer opening irregular duration has occurred, the result of the determination in step S70 is YES, and the processing advances to step S71.

The processing of steps S71 to S74 is the same as the processing of steps S79 to S82 described above, so is not described here.

As the processing described above is repeated, the pointer advances, and moves beyond the final record (to the foot) of the intermediate merge file. This time, the result of the determination in step S62 of FIG. 15 is NO and the processing advances to step S76. In step S76, the main control unit 101 deletes the intermediate merge file. Hence, the drawer opening irregular duration detection processing ends.

Now, the permitted duration search processing of step S65 in FIG. 16 is described with reference to FIG. 17.

Figure 17:
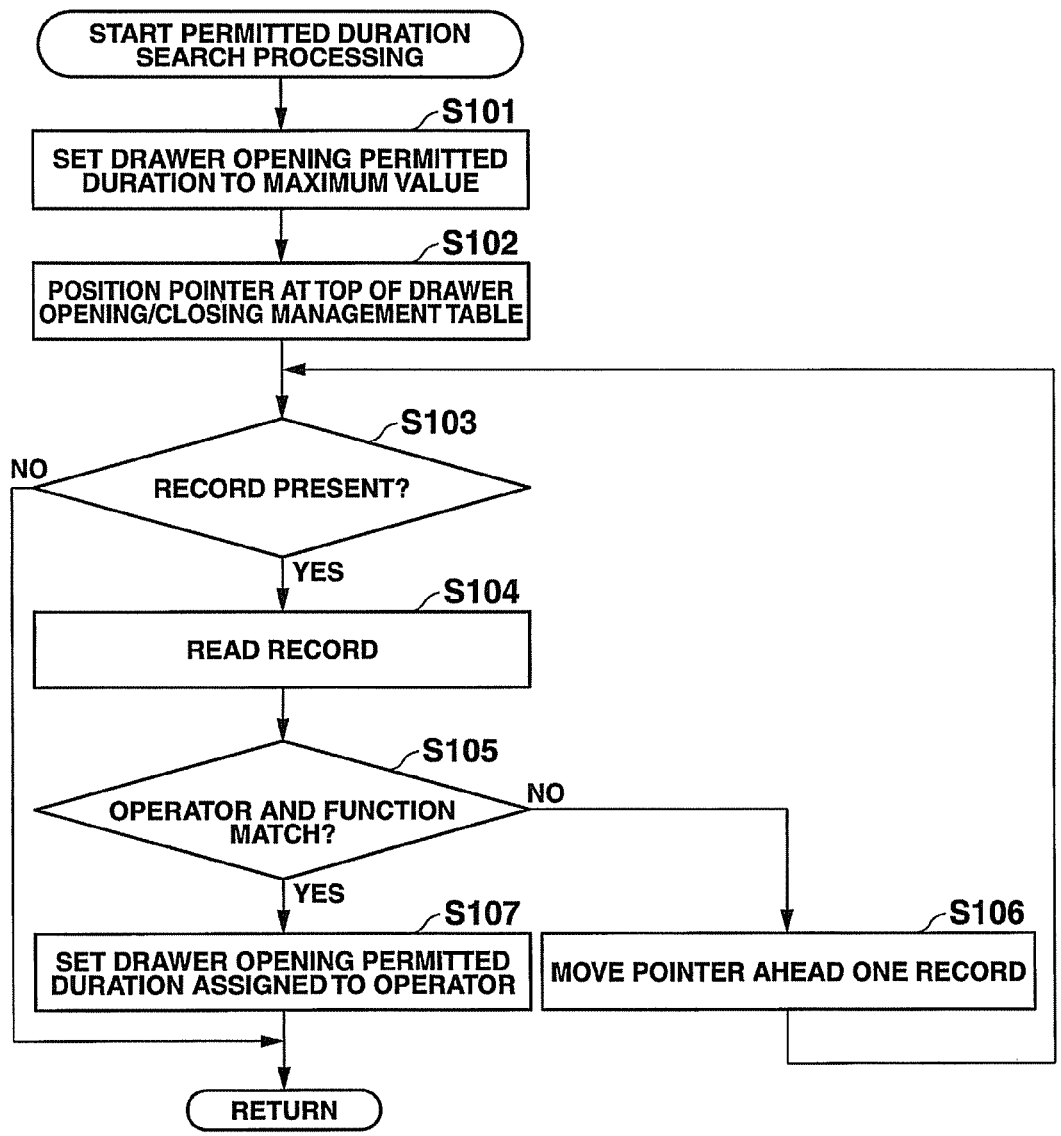
FIG. 17 is a flowchart describing detailed flow of permitted duration search processing in step S65 of FIG. 16.

FIG. 17 is a flowchart describing detailed flow of the permitted duration search processing in step S65 of FIG. 16.

The permitted duration search processing is executed when a record of a function has been read from the intermediate merge file (YES in step S63 of FIG. 15 and YES in step S64 of FIG. 16).

In step S101, the irregularity detection unit 123 sets the drawer opening permitted duration to the maximum value. That is, the maximum value is the initial setting.

In step S102, the irregularity detection unit 123 positions a pointer at the head of the drawer opening/closing management table stored at the reference information storage portion 131.

In step S103, the irregularity detection unit 123 makes a determination as to whether there is a record at the position indicated by the pointer.

If there is a record, the result of the determination in step S103 is YES, and the processing advances to step S104. In step S104, the irregularity detection unit 123 reads the record at the position of the drawer opening/closing management table indicated by the pointer.

In step S105, the irregularity detection unit 123 makes a determination as to whether the combination of operator and function in the record read from the intermediate merge file by the processing of step S63 matches the combination of operator and function in the record read from the drawer opening/closing management table by the processing of step S104.

If these do not match, the drawer opening permitted duration being searched for is not included in the record that has been read by the processing of step S104, the result of the determination in step S105 is NO, and the processing advances to step S106.

In step S106, the irregularity detection unit 123 moves the position of the pointer ahead one record. Then the processing returns to step S103 and the subsequent processing is repeated.

That is, a processing loop of step S103 (YES), step S104, step S105 (NO) and step S106 is repeated and the pointer is successively advanced.

When the combination of operator and function in the record read from the intermediate merge file by the processing of step S63 matches the combination of operator and function in the record read from the drawer opening/closing management table by the processing of step S104, the result of the determination in step S105 is YES, and the processing advances to step S107.

In step S107, the irregularity detection unit 123 sets the drawer opening permitted duration assigned to the operator to that in the record read from the drawer opening/closing management table by the processing of step S104. Thus, the permitted duration search processing ends.

While the above loop processing is repeating, the pointer advances to the end. When there is no readable record, the result of the determination in step S103 is NO, and the permitted duration search processing ends.

When the permitted duration search processing ends, that is, when the processing of step S65 in the drawer opening irregular duration detection processing of FIG. 16 ends, the processing advances to step S66.

Hereabove, of the drawer irregularity detection processing in FIG. 13, the drawer opening irregular duration detection processing of step S23 has been described.

When this drawer opening irregular duration detection processing ends, the processing advances to the drawer opening irregular count detection processing in step S24 of FIG. 13.

The drawer opening irregular count detection processing is described with reference to FIG. 18.

Figure 18:
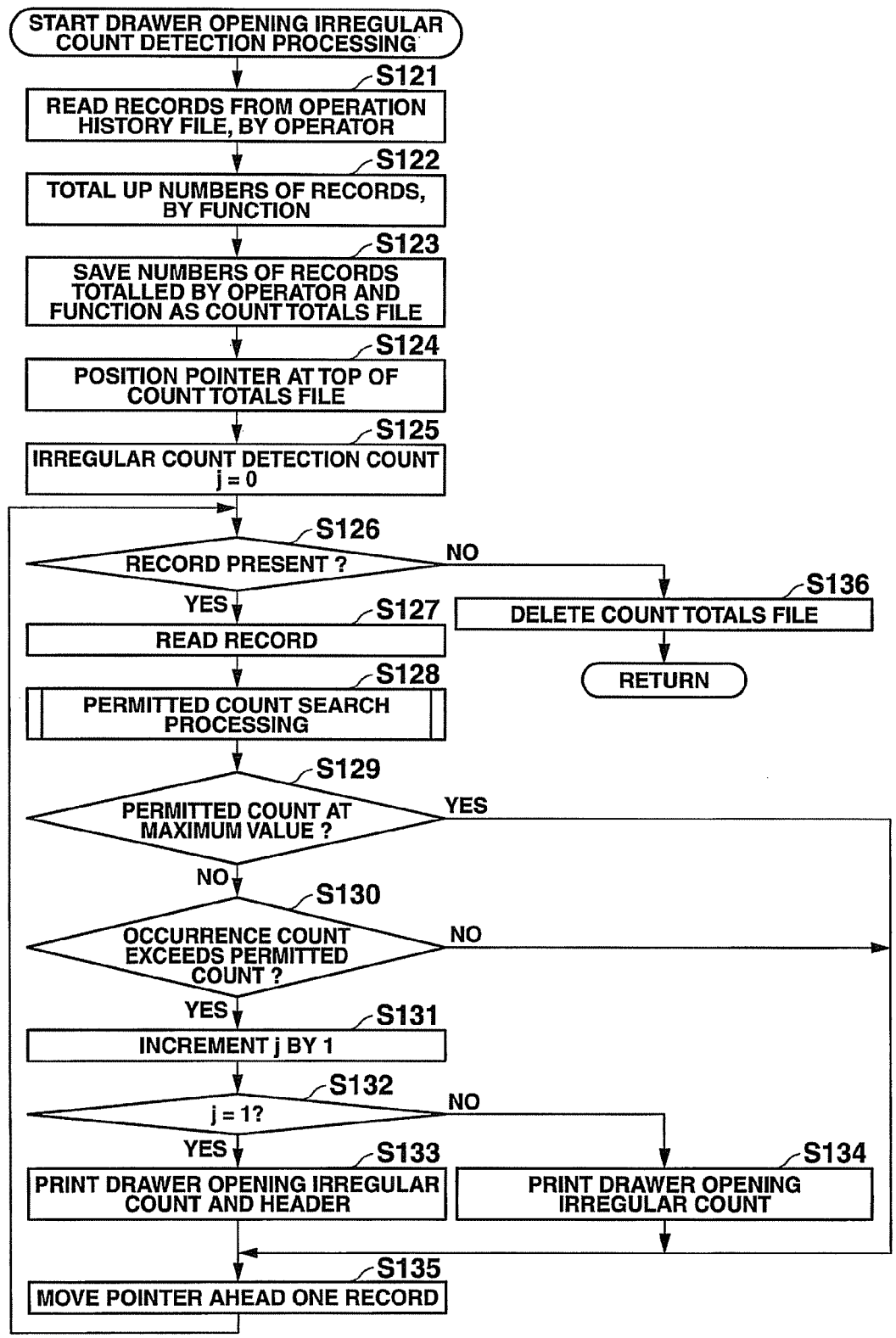
FIG. 18 is a flowchart describing an example of detailed flow of drawer opening irregular count detection processing in step S24 of the drawer irregularity detection processing in FIG. 13.

FIG. 18 is a flowchart describing an example of detailed flow of the drawer opening irregular count detection processing in step S24 of the drawer irregularity detection processing in FIG. 13.

In step S121, the history information acquisition unit 121 reads records separated by operator (operation history information) from the operation history file stored at the operation history information storage portion 132.

In step S122, the history information acquisition unit 121 totals up numbers of records separated by function.

In step S123, the history information acquisition unit 121 saves the numbers of records totalled by operator and by function to the unified history information storage portion 134 as the count totals file (see FIG. 7B).

In step S124, the irregularity detection unit 123 positions a pointer at the head of the count totals file.

In step S125, the irregularity detection unit 123 sets an irregular count detection count j to 0.

In step S126, the irregularity detection unit 123 makes a determination as to whether there is a record at the position of the counts totals file indicated by the pointer.

If there is no record, the result of the determination in step S126 is NO, and the processing advances to step S136. The processing from step S136 onward is described below.

On the other hand, if there is a record, the result of the determination in step S126 is YES, and the processing advances to step S127.

In step S127, the irregularity detection unit 123 reads the record indicated by the pointer from the count totals file.

As a specific example, the pointer is positioned at the first row from the top of the count totals file in FIG. 7B. In this case, the irregularity detection unit 123 reads the record in the first row, which shows a count of occurrences of opening-and-closing of the drawer 25 as being 15 for the function "exchange" and the operator "Ito".

In step S128, the irregularity detection unit 123 searches the drawer opening/closing management table for a drawer opening permitted count for the operator and function corresponding to the record read by the processing of step S127.

The sequence of processing in step S128 is hereinafter referred to as "permitted count search processing". Details of the permitted count search processing are described below with reference to FIG. 19.

In the example mentioned above, in which the first record of the count totals file in FIG. 7B is read, the record is the combination of the function "exchange" and the operator "Ito", so the search finds, in the third row of the drawer opening/closing management table of FIG. 8, a drawer opening permitted count of 10.

In step S129, the irregularity detection unit 123 makes a determination as to whether the drawer opening permitted count is the maximum value.

The drawer opening permitted count being the maximum value means that there is no limit on the count of opening-and-closing of the drawer 25 for the combination of operator and function corresponding with the record read by the processing of step S127. In such a case, the result of the determination in step S129 is YES, and the processing advances to step S135.

In step S135, the irregularity detection unit 123 moves the pointer ahead one record. Therefore, the processing returns to step S126, and the subsequent processing is repeated.

On the other hand, if the drawer opening permitted count is not the maximum value, the result of the determination in step S129 is NO, and the processing advances to step S130.

In step S130, the irregularity detection unit 123 makes a determination as to whether the count of occurrences in the record exceeds the drawer opening permitted count.

If the count of occurrences in the record does not exceed the drawer opening permitted count, a drawer opening irregular count has not occurred, the result of the determination in step S130 is NO, the processing returns to step S135, and the subsequent processing is repeated.

On the other hand, if the count of occurrences in the record exceeds the drawer opening permitted count, a drawer opening irregular count has occurred, the result of the determination in step S130 is YES, and the processing advances to step S131. In step S131, the irregularity detection unit 123 increments the irregular count detection count j by 1 (j=j+1).

In step S132, the irregularity detection unit 123 makes a determination as to whether the irregular count detection count j is 1.

If the irregular count detection count j is 1, this means that a drawer opening irregular count has been detected for the first time. If the irregular count detection count j is 1, the result of the determination in step S132 is YES, and the processing advances to step S133.

In step S133, the irregularity information output control unit 104 controls the printing unit 24 to print a header and the detected drawer opening irregular count. In other words, if a drawer opening irregular count has been detected for the first time, the header is printed as well as the first detected drawer opening irregular count.

In the example mentioned above, in which the pointer is at the first row of the count totals file of FIG. 7B, the count of occurrences in the record is 15. In comparison, the drawer opening permitted count is 10.

Therefore, a drawer opening irregular count has occurred, this is detected, the result of the determination in step S130 is YES, and the processing advances to step S131. The irregular count detection count j is updated from 0 to 1 in step S131, and the result of the determination in step S132 is YES. In the processing of step S133, as illustrated in FIG. 11B, a header "Drawer opening count irregularity report" and the drawer opening irregular count "2011/3/12 Ito Exchange 15" are printed out.

On the other hand, if the irregular count detection count j is not 1, this means that drawer opening irregular counts have been detected two or more times. Accordingly, the result of the determination in step S132 is NO, and the processing advances to step S134. In step S134, the irregularity information output control unit 104 controls the printing unit 24 to print the detected drawer opening irregular count. In other words, if drawer opening irregular counts have been detected two or more times, there is no need to print the header, so only the detected drawer opening irregular count is printed.

As the processing described above is repeated, the pointer advances, and moves beyond the final record (to the foot) of the count totals file. This time, the result of the determination in step S126 is NO and the processing advances to step S136.

In step S136, the main control unit 101 deletes the count totals file.

Hence, the drawer opening irregular count detection processing ends.

Now, the permitted count search processing of step S128 in FIG. 18 is described with reference to FIG. 19.

Figure 19:
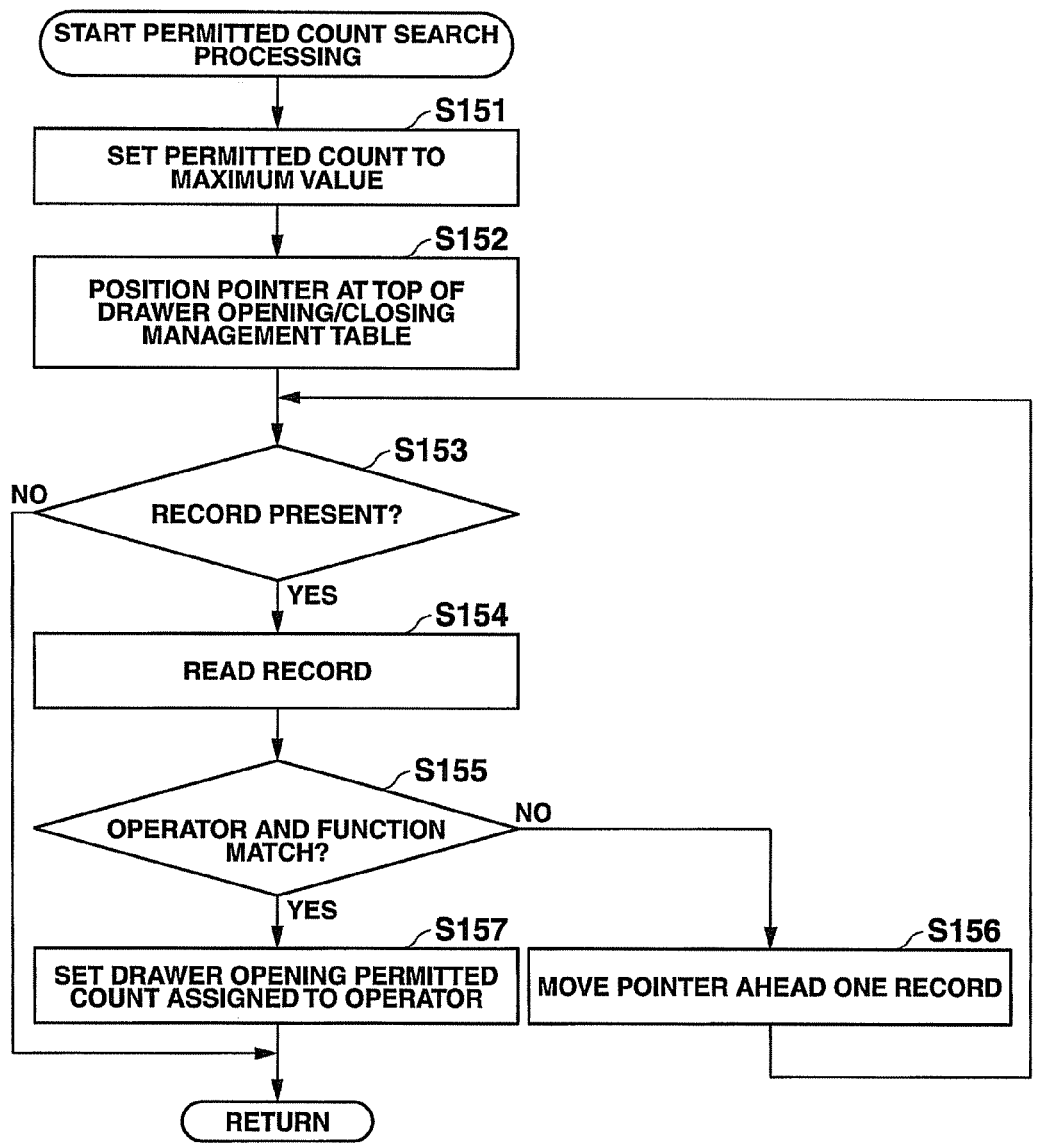
FIG. 19 is a flowchart describing detailed flow of permitted count search processing in step S128 of FIG. 18.

FIG. 19 is a flowchart describing detailed flow of the permitted count search processing in step S128 of FIG. 18.

The permitted count search processing is executed when a record has been read from the count totals file (see step S127).

In step S151, the irregularity detection unit 123 sets the drawer opening permitted count to the maximum value. That is, the maximum value is the initial setting.

In step S152, the irregularity detection unit 123 positions the pointer at the top of the drawer opening/closing management table stored at the reference information storage portion 131.

In step S153, the irregularity detection unit 123 makes a determination as to whether there is a record at the position indicated by the pointer.

If there is a record, the result of the determination in step S153 is YES, and the processing advances to step S154. In step S154, the irregularity detection unit 123 reads a record at the position of the drawer opening/closing management table indicated by the pointer.

In step S155, the irregularity detection unit 123 makes a determination as to whether the combination of operator and function in the record read from the count totals file by the processing of step S127 matches the combination of operator and function in the record read from the drawer opening/closing management table by the processing of step S154.

If these do not match, the target drawer opening permitted count is not included in the record that has been read by the processing of step S154, the result of the determination in step S155 is NO, and the processing advances to step S156.

In step S156, the irregularity detection unit 123 moves the position of the pointer ahead one record. Then the processing returns to step S153 and the subsequent processing is repeated.

That is, a processing loop of step S153 (YES), step S154, step S155 (NO) and step S156 is repeated and the pointer is successively advanced.

Hence, when the combination of operator and function in the record read from the count totals file by the processing of step S155 matches the combination of operator and function in the record read from the drawer opening/closing management table by the processing of step S154, the result of the determination in step S155 is YES, and the processing advances to step S157.

In step S157, the irregularity detection unit 123 sets the drawer opening permitted count assigned to the operator to that in the record read from the drawer opening/closing management table by the processing of step S154. Thus, the permitted count search processing ends.

While the above loop processing is repeating, the pointer advances to the end. When there is no readable record, the result of the determination in step S153 is NO, and the permitted count search processing ends.

When the permitted count search processing ends, that is, when the processing of step S128 in the drawer opening irregular count detection processing of FIG. 18 ends, the processing advances to step S129.

In the above descriptions, the sales data processing device 10 automatically opens the drawer 25 when a function requiring that cash received from a customer be stored in the drawer 25 or that change be given to a customer be taken from the drawer 25 is executed, such as "cash", "prepare change", "exchange", etc. However, the opened drawer 25 is not closed automatically but closed by manual operation by an operator.

Opening and closing of the drawer 25 associated with these functions has short durations, and the frequencies of opening and closing are not high. Therefore, if an opening-to-closing duration of the drawer 25 is long or the opening-and-closing frequency of the drawer 25 is a high count, there is a suspicion that cash is being taken from the drawer 25 improperly.

Accordingly, standard opening durations of the drawer 25 (the drawer opening permitted durations) and standard opening-and-closing counts (the drawer opening permitted counts) required for each operator and each function are set in advance. The sales data processing device 10 respectively compares the standard opening durations and standard opening-and-closing counts of the drawer 25 with the opening durations and opening-and-closing counts in the operation history of when functions were actually carried out by an operator. On the basis of the results of these comparisons, an operation history in which there is a suspicion of cash being improperly taken from the drawer 25 may be detected in the form of irregular drawer operations.

Specifically, in the sales data processing device 10 at which the drawer 25 is opened subject to operation by an operator, a drawer irregularity detection device that detects operations that have a suspicion of cash being improperly taken from the drawer 25 as irregular drawer operations is incorporated in the sales data processing device 10.

This drawer irregularity detection device is provided with the history information acquisition unit 121, the reference information acquisition unit 122 and the irregularity detection unit 123.

The history information acquisition unit 121 acquires a history of operations (functions) of the sales data processing device 10.

From the standard operation references (drawer opening permitted durations and drawer opening permitted counts) set in advance for the respective operations (functions) that open the drawer 25, the reference information acquisition unit 122 acquires standard operation references for operations specified in the history.

For each operation specified in the history, the irregularity detection unit 123 finds differences from the standard operation references acquired by the reference information acquisition unit 122, and if there is a difference of at least a predetermined level, detects that the operation is an irregular drawer operation.

Thus, an operation history of the sales data processing device 10 in which there is a suspicion of cash being improperly taken from the drawer 25 may be appropriately, reliably and efficiently detected as irregular operations of the drawer 25.

It should be noted that the present invention is not limited to the embodiment described above, and any modifications and improvements thereto within the scope that can realize the object of the present invention are included in the present invention.

For example, in the present embodiment, the respective functions of the sales data processing device are accommodated in a single housing. However, this is not particularly limiting and the functions may be dispersed.

In particular, at least part of the portions 131 to 134 need not particularly be provided at the storage unit 40 of the sales data processing device 10, and may be provided at a device external to the sales data processing device 10 (a server or the like).

Furthermore, if a drawer opening permitted duration and drawer opening permitted count are not present in the reference information storage portion 131, a historical average opening duration of the drawer 25 and opening-and-closing count of the drawer 25 may be calculated from operation history information of the respective function and acquired to be used as the drawer opening permitted duration and drawer opening permitted count.

In the embodiment described above, the sales data processing device 10 in which the present invention is employed is described as an example but is not particularly limiting. For example, the present invention may be generally applied to electronic devices with the drawer 25.

The processing sequence described above can be executed by hardware, and also can be executed by software.

In other words, the functional configuration shown in FIG. 3 is merely an illustrative example, and the present invention is not particularly limited thereto. More specifically, the types of functional blocks employed to realize the above-described functions are not particularly limited to the example of FIG. 3, so long as the sales data processing device 10 can be provided with the functions enabling the aforementioned processing sequence to be executed in its entirety.

A single functional block may be configured by a single piece of hardware, a single installation of software, or any combination thereof.

In a case in which the processing sequence is to be executed by software, a program configuring the software is installed from a network or a storage medium into a computer or the like.

The computer may be a computer embedded in dedicated hardware.

Alternatively, the computer may be a computer capable of executing various functions by installing various programs, e.g., a general-purpose personal computer.

The storage medium containing such a program can not only be constituted by the removable medium 71 shown in FIG. 3 distributed separately from the device main body for supplying the program to an operator, but also can be constituted by a storage medium or the like supplied to the operator in a state incorporated in the device main body in advance.

The removable medium 71 is constituted by, for example, a magnetic disc (including a floppy disk), an optical disc, a magneto-optical disc or the like. The optical disk is composed of a CD-ROM (Compact Disc-Read Only Memory), a DVD (Digital Versatile Disc), or the like, for example. The magneto-optical disk is composed of an MD (Mini-Disk) or the like. A recording medium that is supplied to operators in a state of being incorporated in the main body of the equipment is constituted by, for example, the ROM 32 of FIG. 2, in which the program is stored, a hard disc included in the storage unit 40, or the like.

It should be noted that, in the present specification, the steps describing the program stored in the storage medium include not only the processing executed in a time series following this order, but also processing executed in parallel or individually, which is not necessarily executed in a time series.

Moreover, the term "system" as used in the present specification is intended to include the whole of equipment constituted by plural devices, plural units and the like.

A number of embodiments of the present invention are explained hereabove. These embodiments are merely examples and do not limit the technical scope of the invention. The present invention may be attained by numerous other embodiments, and numerous modifications such as omissions, substitutions and the like are possible within a technical scope not departing from the spirit of the invention. These embodiments and modifications are to be encompassed by the scope and gist of the invention recited in the present specification, etc., and are encompassed by the inventions recited in the attached claims and their equivalents.

The invention claimed is:

1. A sales data processing device that accepts operations by an operator and opens a drawer, the device comprising:
   a sensor that detects opened and closed states of the drawer;
   a memory to store instructions; and
   a processor, coupled to the memory, that facilitates execution of the instructions to perform operations, comprising:
   a history acquisition unit that acquires a history of an operation duration for each operation of various types of operations that causes the drawer to be open by the operator, by detecting the opened and closed states of the drawer with the sensor and generating the history of the operation duration;

an operation duration acquisition unit that acquires, from standard operation durations set in advance for each operation of various types of operations that cause the drawer to open, the standard operation duration corresponding to the various types of operations specified in the history; and an irregularity detection unit that, for each operation of various types of operations specified in the history, finds a difference between an operation duration of the each operation and the standard operation duration acquired by the operation duration acquisition unit, determines whether an operation that required a duration longer at a certain length than the standard operation duration exists among the operations specified in the history, and, if the operation is determined to exist, detects that the operation is an irregular drawer operation, wherein the history acquisition unit acquires a history of operation counts for each operation of various types of operations that cause the drawer to open by the operator, by detecting the opened and closed states of the drawer with the sensor and generating the history of the operation counts, the device further comprising an operation count acquisition unit that acquires standard operation counts corresponding to the various types of operations specified in the history, from among the standard operation counts set in advance for each operation of various types of operations that causes the drawer to open, and wherein the irregularity detection unit, for each operation of various types of operations specified in the history, finds a difference between an operation count of the each operation and the standard operation count acquired by the operation count acquisition unit, determines whether an operation that required more than the operation count at a certain count than the standard operation count exists among the operations specified in the history, and, if the operation is determined to exist, detects that the operation is an irregular drawer operation.

2. The sales data processing device according to claim 1, wherein
a login operation is accepted from an operator among a plurality of operators,
the standard operation duration that are set in advance for each operation of various types of operations that cause the drawer to open are set respectively for each of the plurality of operators,
the history acquisition unit acquires a history of an operation duration for each operation of various types of operations that causes the drawn to open by the operator who performed the login operation,
the reference information acquisition unit acquires the standard operation duration for the operator who performed the login operation, and,
for the operator who performed the login operation, the irregularity detection unit finds a difference between an operation duration of the each operation and the standard operation duration acquired by the operation duration acquisition unit, determines whether an operation that required a duration longer at a certain length than the standard operation duration exists among the operations specified in the history, and, if the operation is determined to exist, detects that the operation is an irregular drawer operation.

3. A sales data processing method to be used at a sales data processing device including a sensor that detects opened and closed states of a drawer, the sales data processing device accepts operations by an operator and opens the drawer, the method comprising:
a history acquisition step of acquiring, by a system that includes a processor, a history of an operation duration for each operation of various types of operations that causes the drawer to be open by the operator, by detecting the opened and closed states of the drawer with the sensor and generating the history of the operation duration;
an operation duration acquisition step of acquiring, by the system, from standard operation durations set in advance for each operation of various types of operations that cause the drawer to open, the standard operation duration corresponding to the various types of operations specified in the history; and
an irregularity detection step of, for each operation of various types of operations specified in the history, finding, by the system, a difference between an operation duration of the each operation and the standard operation duration acquired by the operation duration acquisition step, determining whether an operation that required a duration longer at a certain length than the standard operation duration exists among the operations specified in the history, and, if the operation is determined to exist, detecting that the operation is an irregular drawer operation,
wherein the history acquisition step acquires a history of operation counts for each operation of various types of operations that cause the drawer to open by the operator, by detecting the opened and closed states of the drawer with the sensor and generating the history of the operation counts,
an operation count acquisition step acquires standard operation counts corresponding to the various types of operations specified in the history, from among the standard operation counts set in advance for each operation of various types of operations that causes the drawer to open, and
wherein the irregularity detection step, for each operation of various types of operations specified in the history, finds a difference between an operation count of the each operation and the standard operation count acquired by the operation count acquisition step, determining whether an operation that required more than the operation count at a certain count than the standard operation count exists among the operations specified in the history, and, if the operation is determined to exist, detects that the operation is an irregular drawer operation.

4. A non-transitory computer readable medium having stored therein a program executable by a computer which controls a sales data processing device including a sensor that detects opened and closed states of a drawer, the sales data processing device accepts operations by an operator and opens the drawer, causing the computer to realize functions of:
acquiring a history of an operation duration for each operation of various types of operations that causes the drawer to be open by the operator of a sales data processing device that accepts operations by the operator and opens a drawer, by detecting the opened and closed states of the drawer with the sensor and generating the history of the operation duration;

acquiring, from standard operation durations set in advance for each operation of various types of operations that cause the drawer to open, the standard operation duration corresponding to the various types of operations specified in the history;

for each operation of various types of operations specified in the history, finding a difference between an operation duration of the each operation and the standard operation duration acquired from the standard operation durations, determining whether an operation that requires a duration longer at a certain length than the standard operation duration exists among the operations specified in the history, and, if the operation is determined to exist, detecting that the operation is an irregular drawer operation;

acquiring a history of operation counts for each operation of various types of operations that cause the drawer to open by the operator, by detecting the opened and closed states of the drawer with the sensor and generating the history of the operation counts, acquiring standard operation counts corresponding to the various types of operations specified in the history, from among the standard operation counts set in advance for each operation of various types of operations that causes the drawer to open; and for each operation of various types of operations specified in the history, finding a difference between an operation count of the each operation and the standard operation count, determining whether an operation that required more than the operation count at a certain count than the standard operation count exists among the operations specified in the history, and, if the operation is determined to exist, detecting that the operation is an irregular drawer operation.

* * * * *